US012573891B2

(12) United States Patent
Kim et al.

(10) Patent No.: US 12,573,891 B2
(45) Date of Patent: Mar. 10, 2026

(54) WIRELESS POWER TRANSMITTING DEVICE AND METHOD FOR DETECTING APPROACHING OBJECT BY WIRELESS POWER TRANSMITTING DEVICE

(71) Applicant: SAMSUNG ELECTRONICS CO., LTD., Suwon-si (KR)

(72) Inventors: Joonhong Kim, Suwon-si (KR); Beomwoo Gu, Suwon-si (KR); Jaeseok Park, Suwon-si (KR); Jaehyun Park, Suwon-si (KR); Sungku Yeo, Suwon-si (KR); Youngho Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 663 days.

(21) Appl. No.: 17/903,472

(22) Filed: Sep. 6, 2022

(65) Prior Publication Data

US 2023/0077067 A1     Mar. 9, 2023

Related U.S. Application Data

(63) Continuation of application No. PCT/KR2022/012966, filed on Aug. 30, 2022.

(30) Foreign Application Priority Data

Sep. 6, 2021     (KR) ......................... 10-2021-0118669
Feb. 28, 2022     (KR) ......................... 10-2022-0025782

(51) Int. Cl.
    *H02J 50/90*          (2016.01)
    *H02J 50/12*          (2016.01)
(52) U.S. Cl.
    CPC .............. *H02J 50/90* (2016.02); *H02J 50/12* (2016.02)

(58) Field of Classification Search
None
See application file for complete search history.

(56) References Cited

U.S. PATENT DOCUMENTS

2009/0128262 A1     5/2009   Lee et al.
2010/0201202 A1     8/2010   Kirby et al.
(Continued)

FOREIGN PATENT DOCUMENTS

JP          2014-140303          7/2014
JP          2018-107944          7/2018
(Continued)

OTHER PUBLICATIONS

Search Report and Written Opinion dated Dec. 6, 2022 issued in International Patent Application No. PCT/KR2022/012966.
(Continued)

*Primary Examiner* — Daniel Kessie
(74) *Attorney, Agent, or Firm* — Nixon & Vanderhye P.C.

(57)                ABSTRACT

The disclosure provides a wireless power transmitting device and a method for detecting an approaching object by the wireless power transmitting device. According to the disclosure, a wireless power transmitting device may comprise: a power amplifier, a transmission resonator including a coil, and configured to receive an electrical signal corresponding to a first frequency, which is output through the power amplifier, and to form a magnetic field by the received electrical signal corresponding to the first frequency to transmit power, an antenna configured in a shape corresponding to any one side of a symmetrical axis of a split ring resonator (SRR) antenna, disposed adjacent to the transmission resonator, and configured to receive a signal corresponding to a second frequency, a sensing circuit configured to sense at least part of the signal corresponding to the second frequency transmitted to the antenna, and a controller configured to identify whether a human body approaches, (Continued)

based on a signal sensed through the sensing circuit. A first terminal of the sensing circuit may be connected to a first portion of the antenna, and a second terminal of the sensing circuit may be connected to the coil of the transmission resonator.

20 Claims, 18 Drawing Sheets

(56)                    References Cited

U.S. PATENT DOCUMENTS

| | | | |
|---|---|---|---|
| 2011/0012793 A1 | 1/2011 | Amm et al. | |
| 2011/0250928 A1 | 10/2011 | Schlub et al. | |
| 2012/0154245 A1 | 6/2012 | Naguno et al. | |
| 2012/0193997 A1 | 8/2012 | Hong et al. | |
| 2013/0015705 A1 | 1/2013 | Abe | |
| 2015/0042520 A1* | 2/2015 | Zhao | H01Q 9/0421 |
| | | | 343/702 |
| 2015/0311725 A1* | 10/2015 | Yamamoto | H02J 50/60 |
| | | | 307/104 |
| 2015/0349541 A1 | 12/2015 | Yamamoto et al. | |
| 2015/0349543 A1* | 12/2015 | Sakata | H02J 50/70 |
| | | | 307/104 |
| 2016/0028248 A1 | 1/2016 | Asanuma et al. | |
| 2016/0079811 A1* | 3/2016 | Seo | H02J 50/40 |
| | | | 307/104 |
| 2016/0187520 A1 | 6/2016 | Widmer et al. | |
| 2017/0005524 A1 | 1/2017 | Akuzawa et al. | |
| 2019/0385788 A1 | 12/2019 | Arisawa et al. | |
| 2019/0386492 A1 | 12/2019 | Fukuzawa et al. | |
| 2020/0039368 A1 | 2/2020 | Sieber et al. | |
| 2021/0194132 A1 | 6/2021 | Soma et al. | |
| 2022/0037936 A1 | 2/2022 | Ettes et al. | |
| 2023/0208202 A1* | 6/2023 | Draak | H02J 50/12 |
| | | | 307/104 |

FOREIGN PATENT DOCUMENTS

| | | |
|---|---|---|
| KR | 10-2009-0050912 | 5/2009 |
| KR | 10-2012-0035937 | 4/2012 |
| KR | 10-2012-0137382 | 12/2012 |
| KR | 10-2013-0010120 | 1/2013 |
| KR | 10-2013-0076130 | 7/2013 |
| KR | 10-2018-0038205 | 4/2018 |
| KR | 10-2019-0014614 | 2/2019 |
| KR | 10-2019-0076478 | 7/2019 |
| KR | 10-2021-0034057 | 3/2021 |
| KR | 10-2021-0096662 | 8/2021 |
| WO | 2021/081382 | 4/2021 |

OTHER PUBLICATIONS

Extended European Search Report dated Sep. 20, 2024 issued in European Patent Application No. 22865023.0.

Yan et al., "A metamaterial position sensor based on magnetoinductive waves", IEEE Open Journal of Antennas and Propagation, Feb. 4, 2021, 10 pages.

Korean Office Action dated Jan. 27, 2026 for KR Application No. 10-2022-0025782.

* cited by examiner

231

701

231

801　　　802

901

902

231

1001

1002

231

231

1101

1102

231

1201

1204        1202

1203

1301

231

1301b

1301a

WIRELESS POWER TRANSMITTING DEVICE AND METHOD FOR DETECTING APPROACHING OBJECT BY WIRELESS POWER TRANSMITTING DEVICE

CROSS-REFERENCE TO RELATED APPLICATIONS

This application is a continuation of International Application No. PCT/KR2022/012966 designating the United States, filed on Aug. 30, 2022, in the Korean Intellectual Property Receiving Office and claiming priority to Korean Patent Application No. 10-2021-0118669, filed on Sep. 6, 2021, in the Korean Intellectual Property Office, and to Korean Patent Application No. 10-2022-0025782, filed on Feb. 28, 2022, in the Korean Intellectual Property Office, the disclosures of all of which are incorporated by reference herein in their entireties.

BACKGROUND

Field

The disclosure relates to a wireless power transmitting device and a method for detecting an approaching object (foreign object) by the wireless power transmitting device.

Description of Related Art

Wireless charging technology adopts wireless power transmission/reception. For example, wireless charging may automatically charge the battery of a mobile phone by simply placing the mobile phone on a wireless power transmitting device (e.g., a charging pad) without connection via a separate charging connector. Wireless communication technology eliminates the need for a connector for supplying power to electronics, thus providing enhanced waterproofing, and also requires no wired charger to thus provide better portability.

As wireless communication technology evolves, there is an ongoing research effort to charge various electronic devices (e.g., wireless power receiving devices) by supplying power from a single electronic device (e.g., a wireless power transmitting device) to them. Wireless charging techniques include electromagnetic induction methods using a coil, resonance methods using resonance, and RF/microwave radiation methods that convert electric energy into microwaves and transfer the microwaves.

For example, wireless charging techniques using electromagnetic induction or resonance are being widely adopted for electronic devices, such as smartphones. If a power transmitting unit (PTU) (e.g., a wireless power transmitting device) and a power receiving unit (PRU) (e.g., a smartphone or a wearable electronic device) come in contact or close to each other within a predetermined distance, the battery of the power receiving unit may be charged by electromagnetic induction or electromagnetic resonance between the transmission coil (or transmission resonator) of the power transmitting unit and the reception coil (or reception resonator) of the power receiving unit.

A power transmitting unit or wireless power transmitting device may include a coil or a resonator (e.g., a capacitor-connected coil) capable of generating a magnetic field if a current flows therethrough, according to the resonance or induction scheme.

According to various embodiments, the wireless power transmitting device may detect an approaching object. For example, upon generating a magnetic field through the coil or resonator, the wireless power transmitting device may identify whether an object is present or whether an operation is approaching using the variation in impedance measured in the circuit. The loop-type coil or resonator included in the wireless power transmitting device may form a magnetic field and sense whether a conductor or a metal approaches through the coil or resonator. Since the magnetic field formed through the coil or resonator in the wireless power transmitting device is related to permeability, it may be difficult to detect whether a human body, which is relatively high in permittivity than the conductor or metal, approaches through the coil or resonator.

SUMMARY

Embodiments of the disclosure provide a wireless power transmitting device and method for detecting an approaching object by the wireless power transmitting device, which may identify whether a human body is present or whether a human body approaches by placing an additional antenna for detecting a human body in a position adjacent to the coil or resonator in the wireless power transmitting device including the coil or resonator.

According to an example embodiment, a wireless power transmitting device may comprise: a power amplifier; a transmission resonator including a coil, configured to receive an electrical signal corresponding to a first frequency output through the power amplifier, and to form a magnetic field by the received electrical signal corresponding to the first frequency to transmit power; an antenna having a shape corresponding to any one side of a symmetrical axis of a split ring resonator (SRR) antenna disposed adjacent to the transmission resonator and configured to receive a signal corresponding to a second frequency; a sensing circuit configured to sense at least part of the signal corresponding to the second frequency transmitted to the antenna; and a controller configured to: identify whether a human body approaches at least based on a signal sensed through the sensing circuit. A first terminal of the sensing circuit may be connected to a first portion of the antenna, and a second terminal of the sensing circuit may be connected to the coil of the transmission resonator.

According to an example embodiment, a method for detecting an approaching object by a wireless power transmitting device may comprise: transmitting power by forming a magnetic field by an electrical signal corresponding to a first frequency output through a power amplifier by a transmission resonator including a coil; identifying whether a conductor approaches, at least based on a signal sensed from the electrical signal corresponding to the first frequency, by a controller; transmitting a signal corresponding to a second frequency from an antenna disposed adjacent to the transmission resonator; and identifying whether a human body approaches, at least based on a signal sensed from the signal corresponding to the second frequency, by the controller.

According to an example embodiment, a wireless power transmitting device may comprise: a power amplifier; a transmission resonator including a coil configured to receive an electrical signal corresponding to a first frequency, which is output through the power amplifier, and form a magnetic field by the received electrical signal corresponding to the first frequency to transmit power; an antenna disposed adjacent to the transmission resonator and configured to receive a signal corresponding to a second frequency; a sensing circuit configured to sense at least part of the signal corresponding to the second frequency transmitted to the antenna; and a controller configured to determine whether a human body approaches, at least based on a signal sensed through the sensing circuit. A first output terminal of the sensing circuit may be connected to a first portion of the antenna, and a second output terminal of the sensing circuit may be connected to the coil of the transmission resonator.

According to various example embodiments, the wireless power transmitting device and method for detecting an approaching object by the wireless power transmitting device may identify whether a human body is present or whether a human body approaches, as well as whether a metal or conductor approaches in the wireless power transmitting device by placing an additional antenna for detecting the human body as well as the coil or resonator for wirelessly transmitting power.

BRIEF DESCRIPTION OF THE DRAWINGS

The above and other aspects, features and advantages of certain embodiments of the present disclosure will be more apparent from the following detailed description, taken in conjunction with the accompanying drawings, in which.

4

Figure 16:
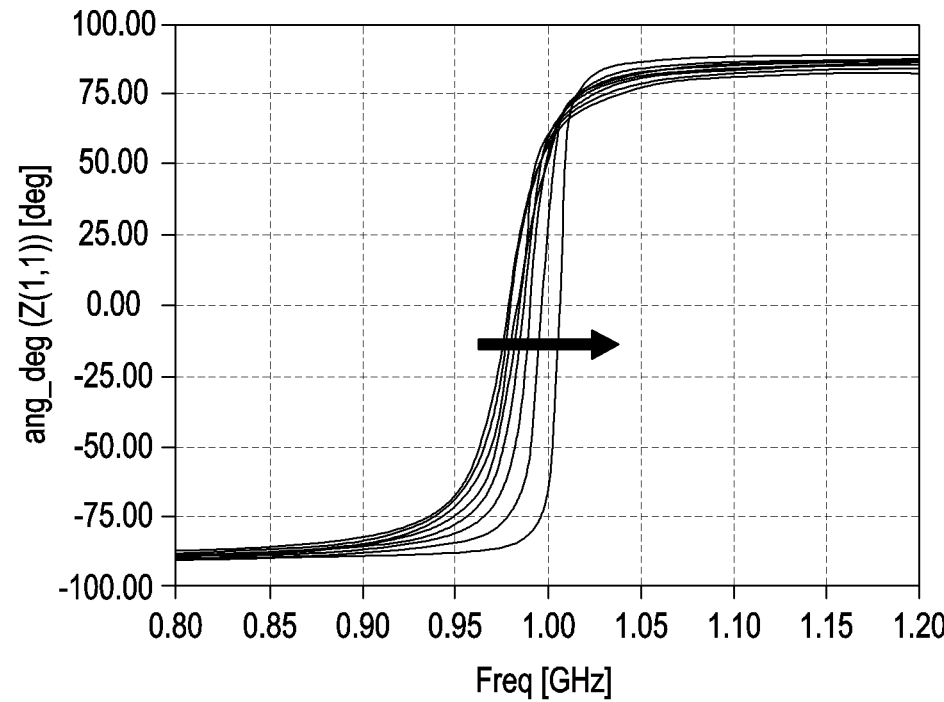
Figure 17:
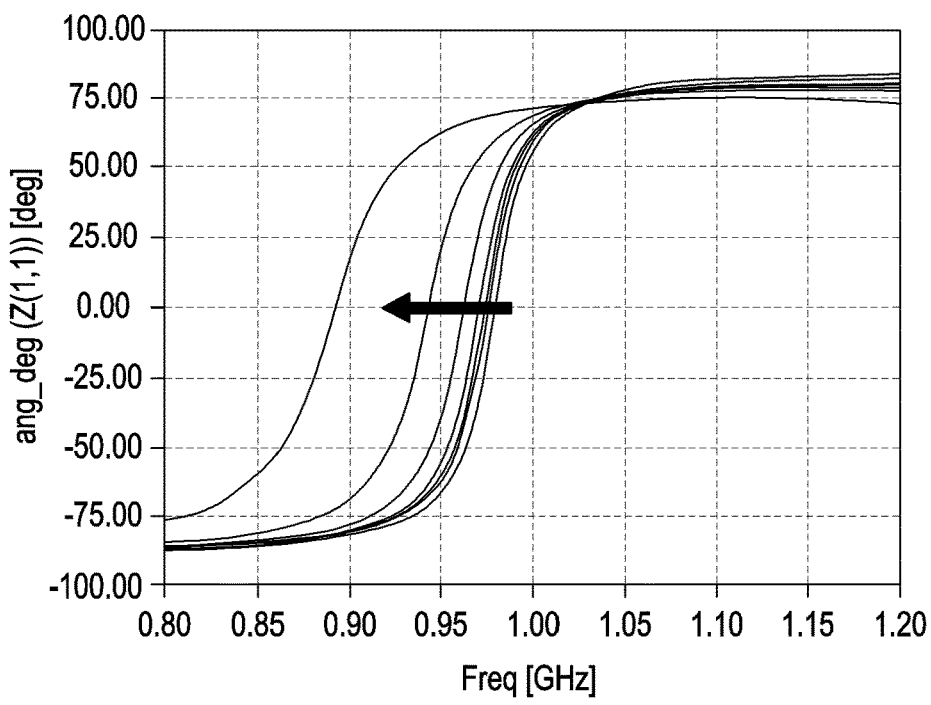
Figure 18:
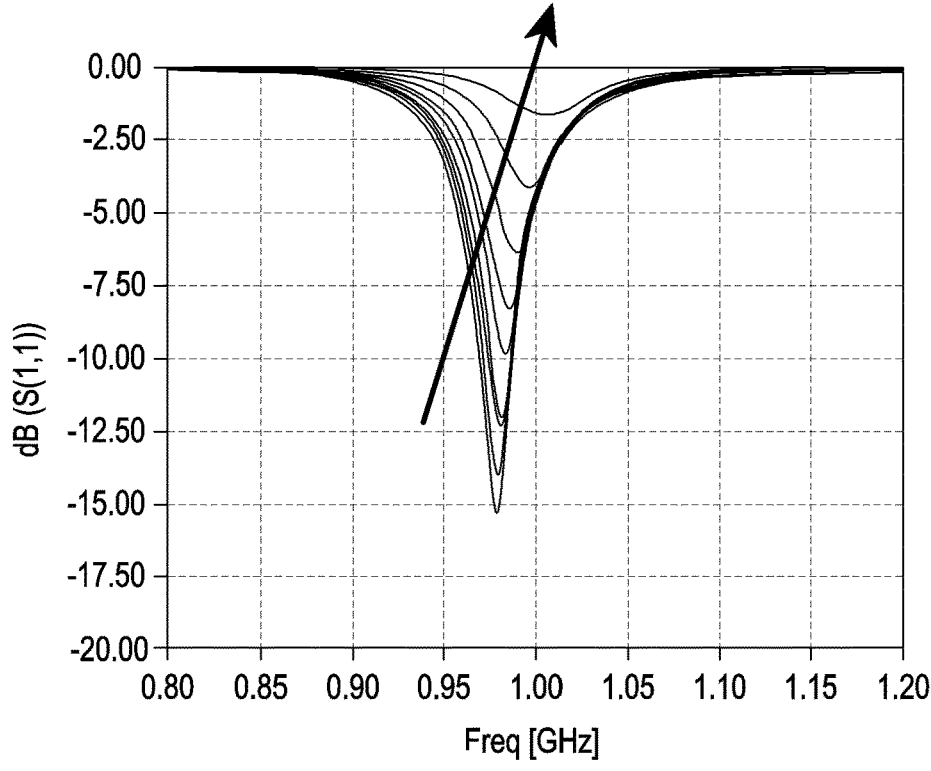
Figure 19:
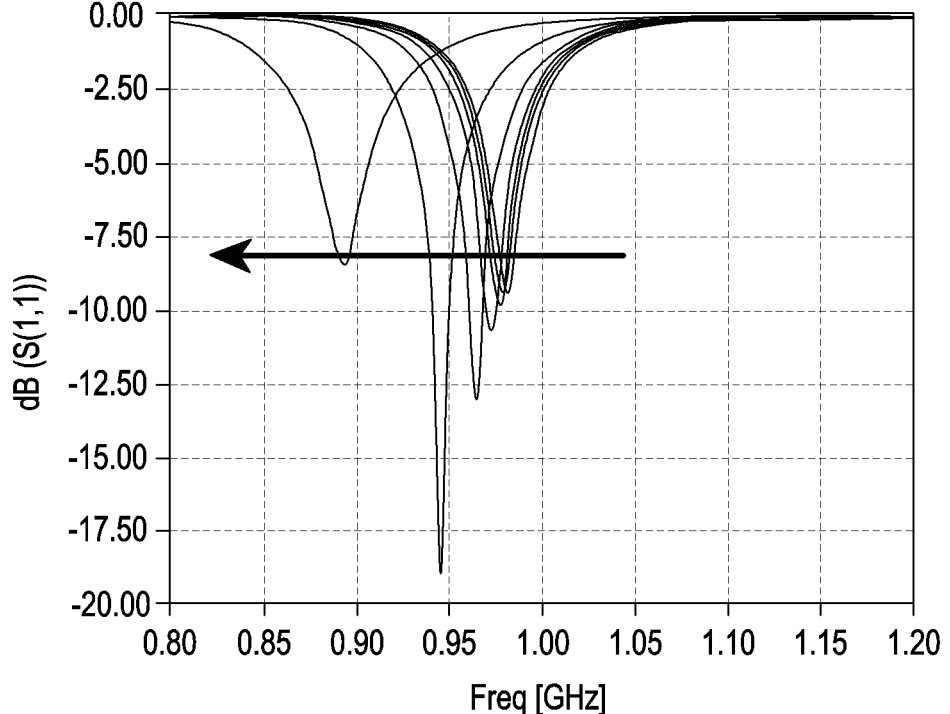
Figure 20:
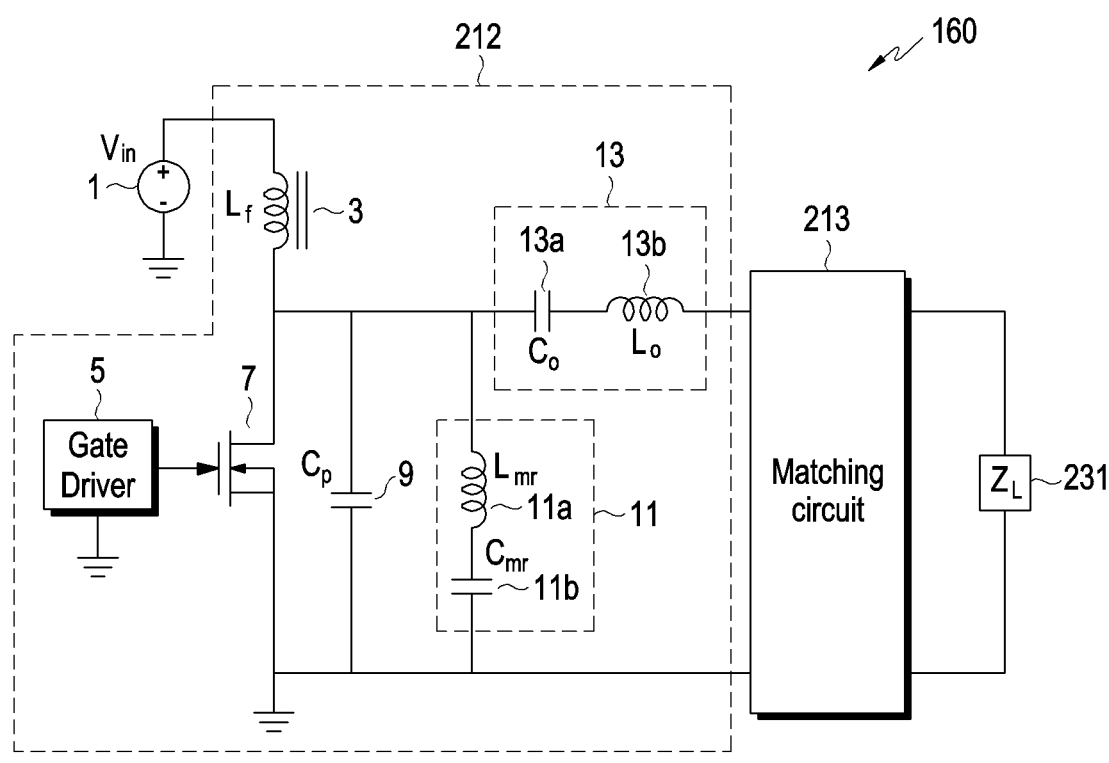
Figure 21:
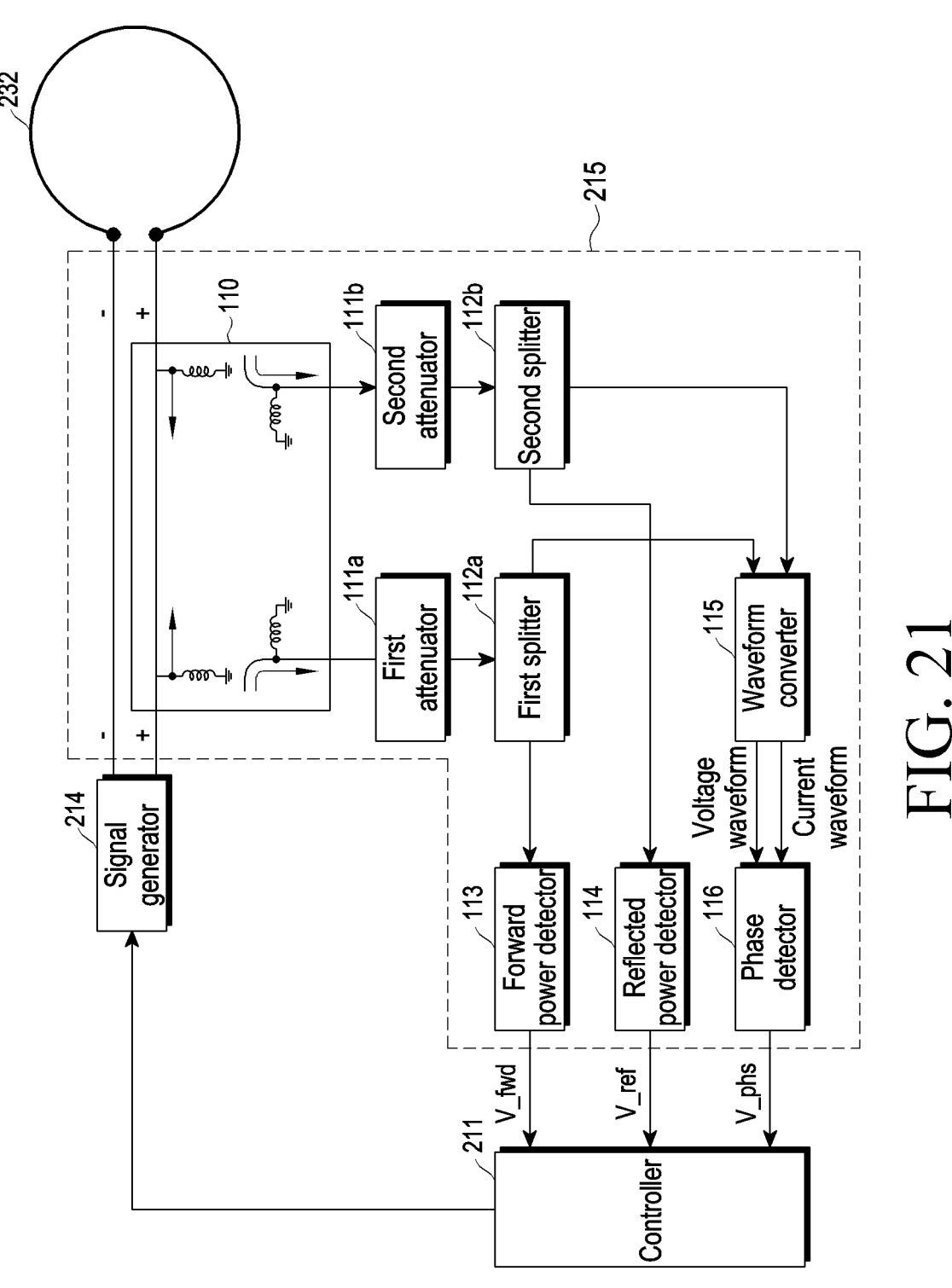
Figure 22:
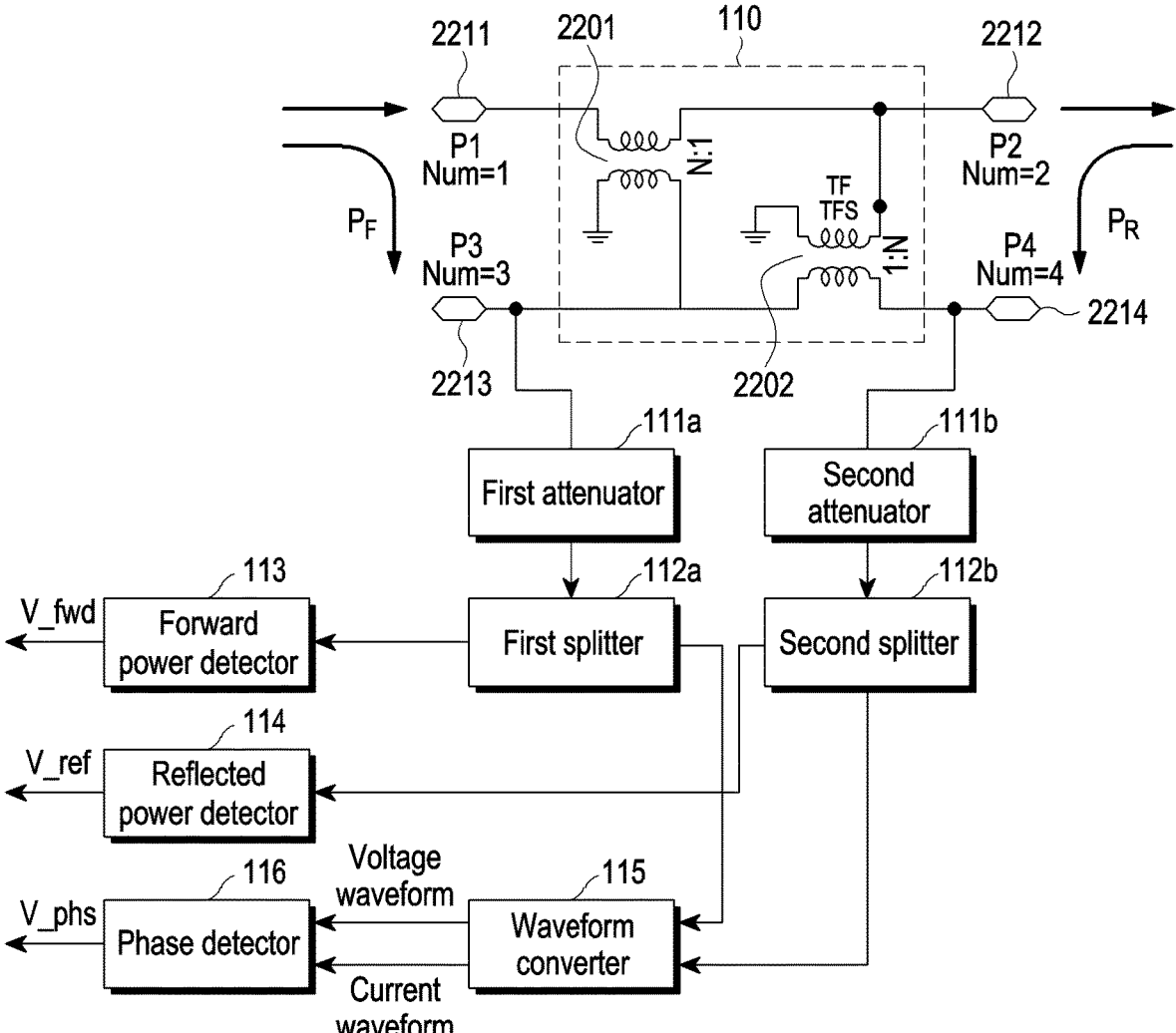
Figure 23:
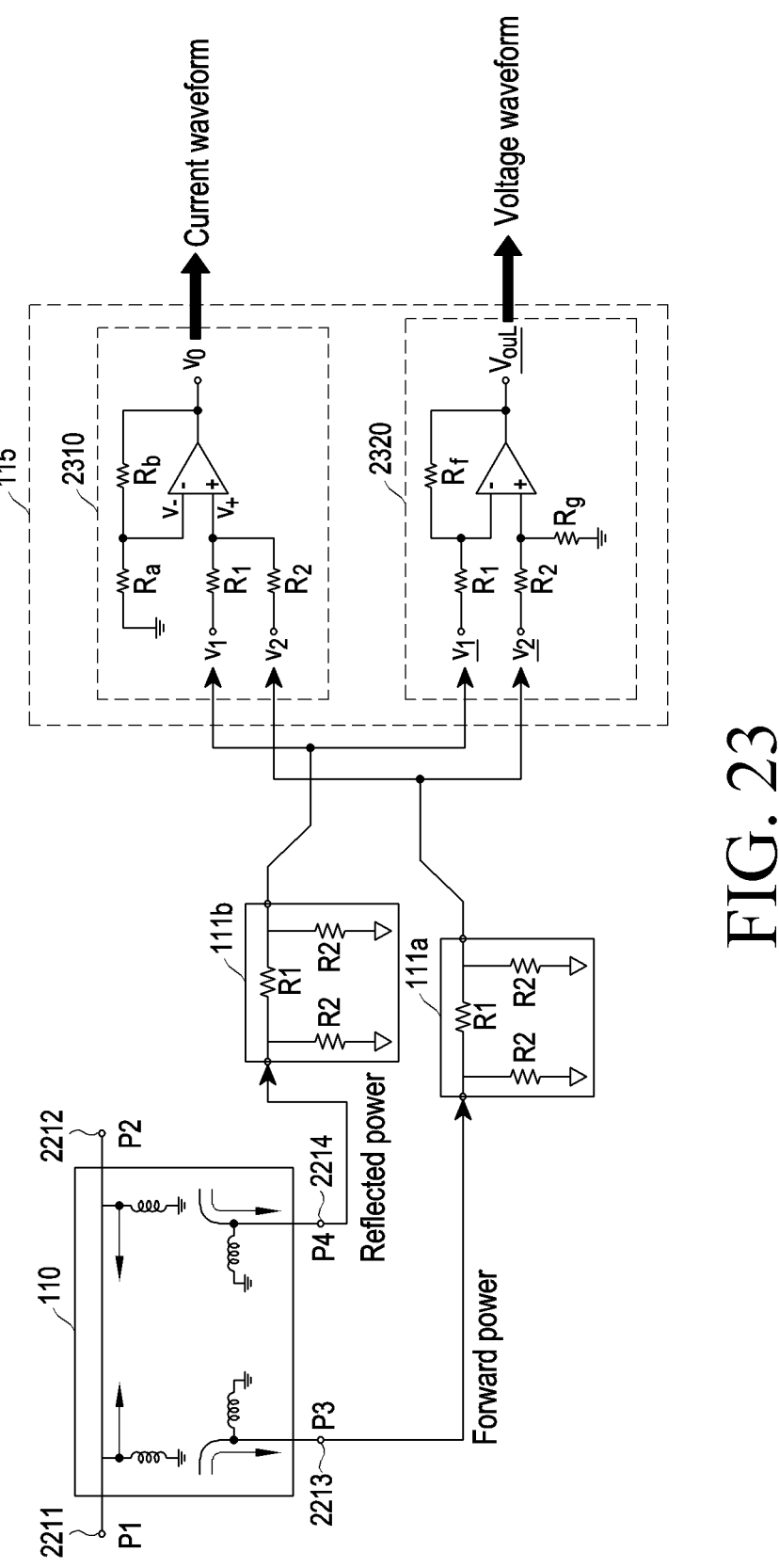
Figure 24:
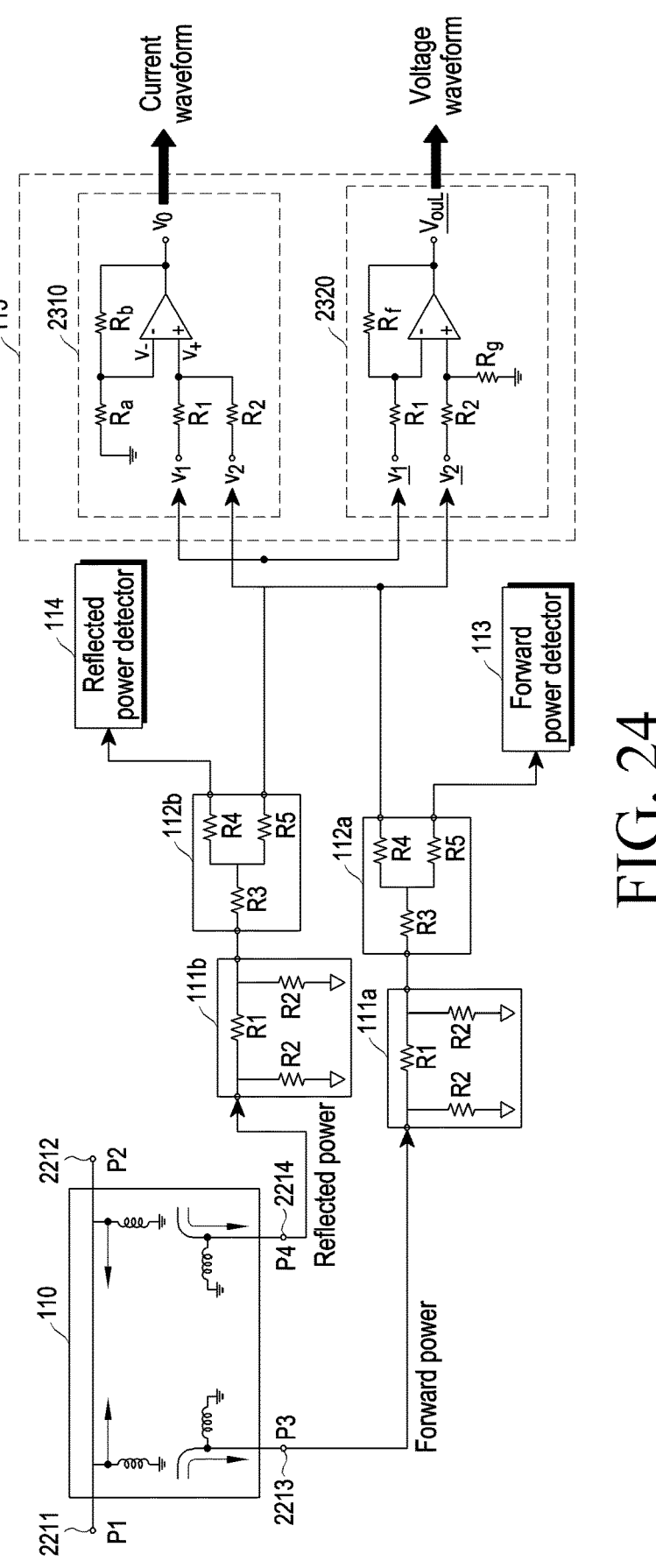
Figure 25:
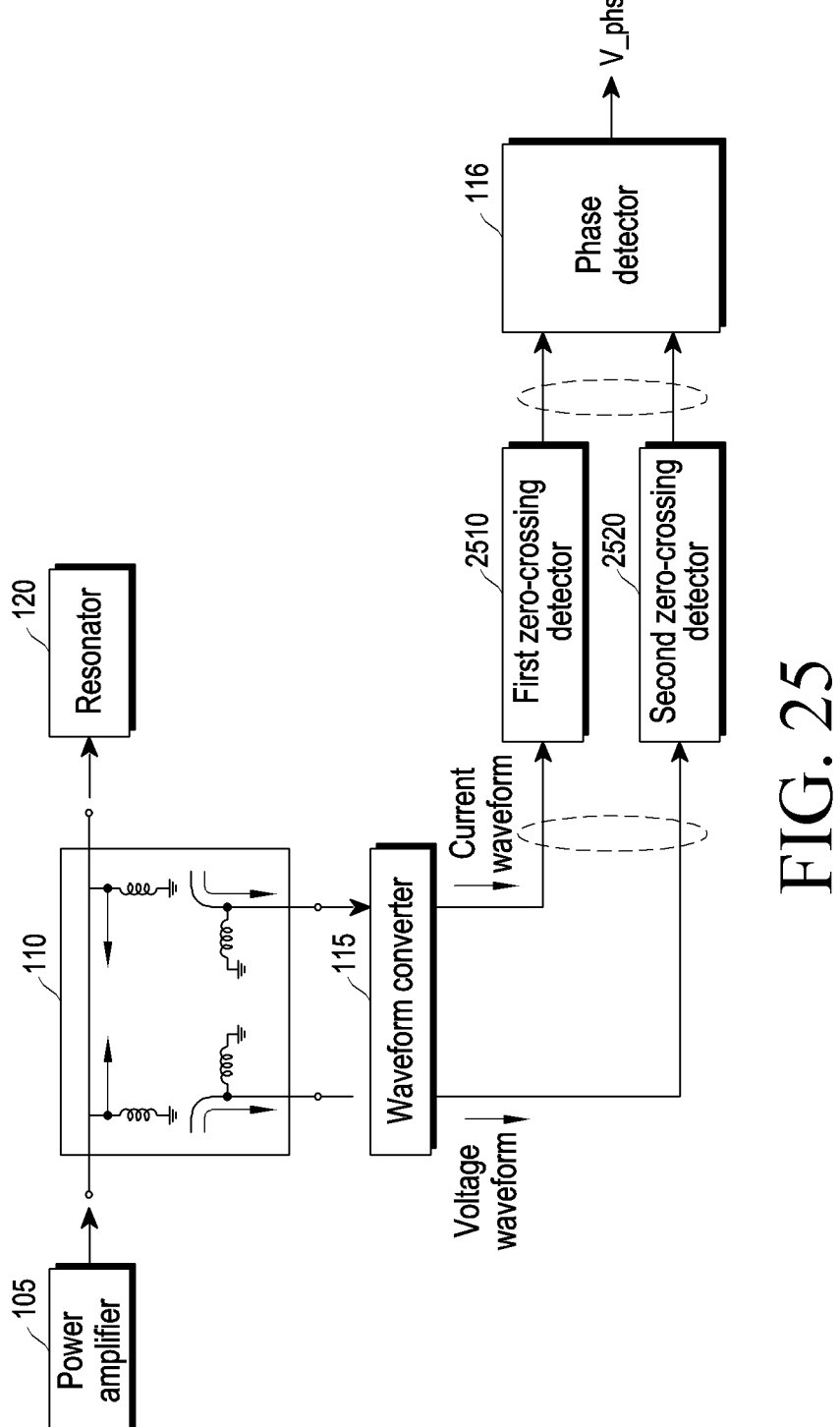

FIG. 16 is a graph illustrating a phase corresponding to a frequency for each frequency when a conductor approaches according to various embodiments;

FIG. 17 is a graph illustrating a phase corresponding to a frequency for each frequency when a human body approaches according to various embodiments;

FIG. 18 is a graph illustrating a reflection coefficient corresponding to a frequency for each frequency when a conductor approaches according to various embodiments;

FIG. 19 is a graph illustrating a reflection coefficient corresponding to a frequency for each frequency when a human body approaches according to various embodiments;

FIG. 20 is a block diagram illustrating an example configuration of a wireless power transmitting device according to various embodiments;

FIG. 21 is a block diagram illustrating an example configuration of a wireless power transmitting device according to various embodiments;

FIG. 22 is a block diagram illustrating an example configuration of a wireless power transmitting device according to various embodiments;

FIG. 23 is a block diagram illustrating an example configuration of a wireless power transmitting device according to various embodiments;

FIG. 24 is a block diagram illustrating an example configuration of a wireless power transmitting device according to various embodiments; and FIG. 25 is a block diagram illustrating an example configuration of a wireless power transmitting device according to various embodiments.

DETAILED DESCRIPTION

Hereinafter, various example embodiments of the disclosure are described in greater detail with reference to the accompanying drawings. It should be noted that the same element denotations are used to refer to the same elements throughout the disclosure. When making the gist of the present disclosure unclear, the detailed description of known functions or configurations may be omitted.

Figure 1:
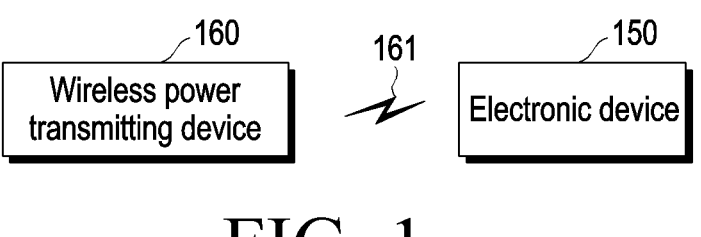
FIG. 1 is a block diagram illustrating an example configuration of a wireless power transmitting device and a wireless power receiving device according to various embodiments.

FIG. 1 is a block diagram illustrating an example configuration of a wireless power transmitting device and a wireless power receiving device according to various embodiments.

Referring to FIG. 1, according to various embodiments, a wireless power transmitting device 160 (e.g., an electronic device) may wirelessly transmit power 161 to a wireless power receiving device (hereinafter, referred to as an 'electronic device 150' or an 'external electronic device'). The wireless power transmitting device 160 may transmit the power 161 to the electronic device 150 according to various charging schemes. For example, the wireless power transmitting device 160 may transmit the power 161 according to an induction scheme. When the wireless power transmitting device 160 transmits power 161 by an induction scheme, the wireless power transmitting device 160 may include, e.g., a power source, a direct current (DC)-alternating current (AC) converting circuit, an amplifying circuit, an impedance matching circuit, at least one capacitor, at least one coil, and a communication modulation/demodulation circuit. The at least one capacitor together with the at least one coil may comprise a resonance circuit (resonator). The wireless power transmitting device 160 may be operated in a scheme defined in the wireless power consortium (WPC) standards (or Qi standards).

For example, the wireless power transmitting device 160 may transmit the power 161 according to a resonance scheme. When transmitting the power 161 by the resonance scheme, the wireless power transmitting device 160 may include, e.g., a power source, a DC-AC converting circuit, an amplifying circuit, an impedance matching circuit, at least one capacitor, at least one resonator or coil, and an out-band communication circuit (e.g., a Bluetooth low energy (BLE) communication circuit). The at least one capacitor and the at least one resonator or coil may comprise a resonance circuit. The wireless power transmitting device 160 may be operated in a scheme defined in the alliance for wireless power (A4WP) standards (or air fuel alliance (AFA) standards). The wireless power transmitting device 160 may include a resonator or coil that is capable of produce a magnetic field when letting an electric current flow by a resonance or induction scheme. The process of the wireless power transmitting device 160 producing a magnetic field may be represented as the wireless power transmitting device 160 wirelessly transmitting the power 161. Further, the electronic device 150 may include a coil that produces an induced electromotive force by the magnetic field generated around and varying in magnitude over time. The process of the electronic device 150 producing an induced electromotive force through the resonator or coil may be represented as the electronic device 150 wirelessly receiving the power 161.

According to an embodiment of the disclosure, the wireless power transmitting device 160 may communicate with the electronic device 150. For example, the wireless power transmitting device 160 may communicate with the electronic device 150 according to an in-band scheme. The wireless power transmitting device 160 or the electronic device 150 may vary the load (or impedance) corresponding to the data to be transmitted, according to, e.g., an on/off keying modulation scheme. The wireless power transmitting device 160 or the electronic device 150 may determine the data transmitted from the counterpart device by measuring a variation in load (or variation in impedance) based on a variation in the current, voltage, or power across the resonator or coil.

For example, the wireless power transmitting device 160 may communicate with the electronic device 150 according to an out-band (or out-of-band) scheme. The wireless power transmitting device 160 or the electronic device 150 may communicate data using a short-range communication module (e.g., a BLE communication module) provided separately from the resonator, coil, or patch antennas.

Figure 2:
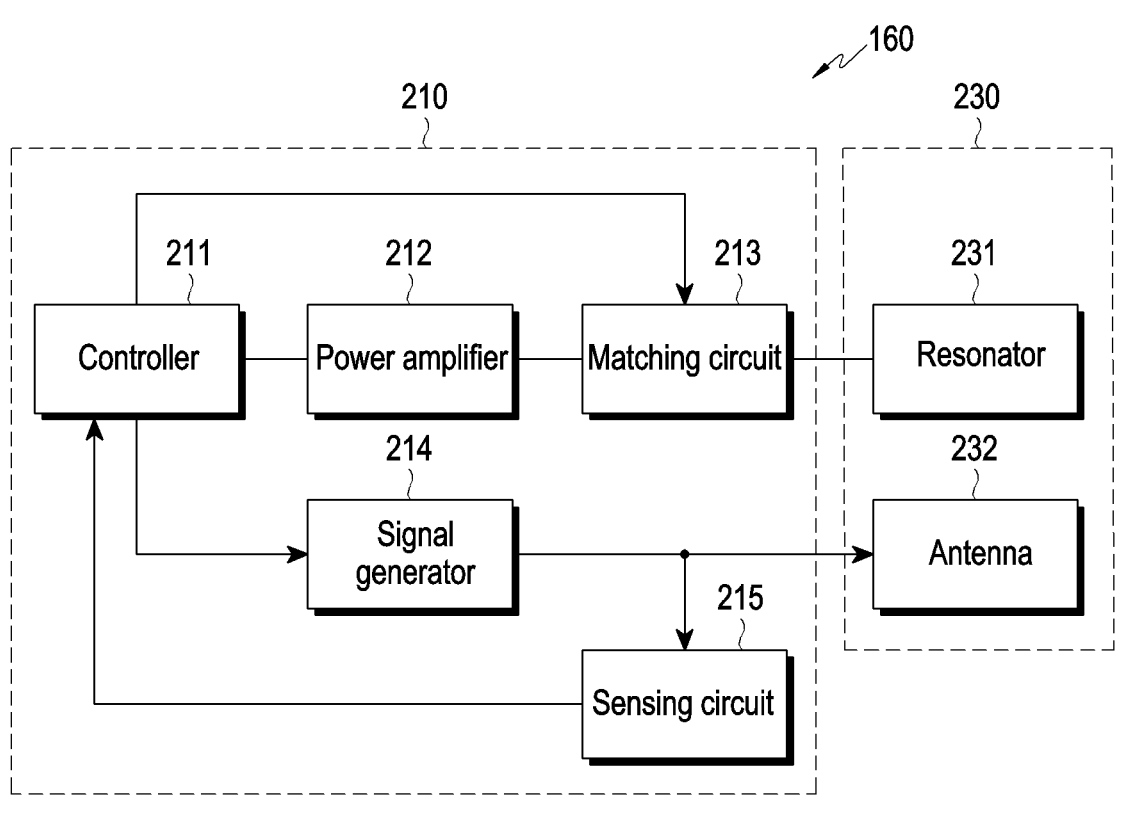
FIG. 2 is a block diagram illustrating and example configuration of a wireless power transmitting device according to various embodiments.

FIG. 2 is a block diagram illustrating an example configuration of a wireless power transmitting device according to various embodiments.

Referring to FIG. 2, a wireless power transmitting device 160 may include a housing 210 and a resonator body 230, but is not limited thereto. For example, according to various embodiments, the resonator body 230 or part of the configuration of the resonator body 230 may be included in the housing 210.

According to various embodiments, the wireless power transmitting device 160 may include a controller (e.g., including processing and/or control circuitry) 211, a power amplifier 212, a matching circuit 213, a signal generator 214, and/or a sensing circuit 215 in the housing 210. For example, the controller 211, the power amplifier 212, the matching circuit 213, the signal generator 214, and the sensing circuit 215 may be included in the housing 210 or be disposed outside the housing 210. The signal generator 214 may be included in the controller 211 or may be configured as a separate circuit outside the controller 211.

According to various embodiments, the resonator body 230 of the wireless power transmitting device 160 may include at least one resonator 231 and at least one antenna 232. According to various embodiments, the at least one resonator 231 may include at least one coil and may further include at least one capacitor. Each resonator 231 may include an N-turn coil, forming a loop, and may include ferrite in at least a portion thereof. According to various embodiments, the at least one resonator 231 may be included in the housing 210 or be disposed outside the housing 210.

According to various embodiments, the power amplifier 212 may include an inverter. The power amplifier 212 may output a signal corresponding to a frequency set from the power input according to the control of the controller 211. For example, when the wireless power transmitting device 160 transmits wireless power according to a resonance scheme standard, the set frequency may be 6.78 MHz, but is not limited thereto. The signal output from the power amplifier 212 may be input to the matching circuit 213. Various example embodiments of the power amplifier 212 are described by way of non-limiting example in greater detail below with reference to FIG. 20.

According to various embodiments, the matching circuit 213 may receive the signal from the power amplifier 212 and perform impedance matching. For example, the matching circuit 213 may provide impedance matching to allow the output impedance to match the impedance of the load. The matching circuit 213 may include, e.g., at least one low-pass filter and/or a band-stop filter, and the low-pass filter may include at least one capacitor.

According to various embodiments, the signal impedance-matched by the matching circuit 213 may be transmitted to the at least one resonator 231. The at least one resonator 231 may generate a magnetic field as current flows based on the resonance scheme or induction scheme. The process of the at least one resonator 231 producing a magnetic field may be represented as the wireless power transmitting device 160 wirelessly transmitting the power 161.

According to various embodiments, the controller 211 may include various processing and/or control circuitry and control the power amplifier 212 to output a signal corresponding to a first frequency (e.g., 6.78 MHz). For example, the power amplifier 212 may output the signal corresponding to the set first frequency (e.g., 6.78 MHz) from the power input according to the control of the controller 211 The controller 211 may identify whether a conductor or metal approaches through the resonator 231.

According to various embodiments, the controller 211 may control the signal generator 214 to output a signal corresponding to a second frequency (e.g., 400 MHz). The second frequency may be a frequency lower than the first frequency. The signal corresponding to the first frequency output from the signal generator 214 may be received and radiated by the antenna 232.

According to various embodiments, the sensing circuit 215 may sense at least part of the signal corresponding to the first frequency transmitted through the antenna 232 or the signal output from the antenna 232 and identify whether a human body is present or whether a human body approaches, at least based on the sensed signal. For example, the antenna 232 may form an electric field based on the signal corresponding to the first frequency. When a human body approaches the wireless power transmitting device 160, the electric field formed by the antenna 232 may be influenced by the permittivity of the human body and be varied. The sensing circuit 215 may sense at least part of the signal corresponding to the first frequency transmitted through the antenna 232 or the signal output from the antenna 232 and identify whether a human body is present or whether a human body approaches, based on the sensed signal or the sensed variation in the signal. Various embodiments of sensing a human body by the antenna 232 in the sensing circuit 215 are described by way of non-limiting example in greater detail below with reference to FIGS. 21, 22, 23, 24, and 25.

According to various embodiments, the controller 211 may identify whether a conductor is present or approaches as identified through the resonator 231 and/or whether a human body is present or approaches as identified through the antenna 232 and control at least one operation of the wireless power transmitting device 160. For example, the controller 211 may control the charging operation on the electronic device or adjust impedance based on identifying whether a character object or human body is present or approaches, identified through the resonator 231 and/or the antenna 232.

Figure 3:
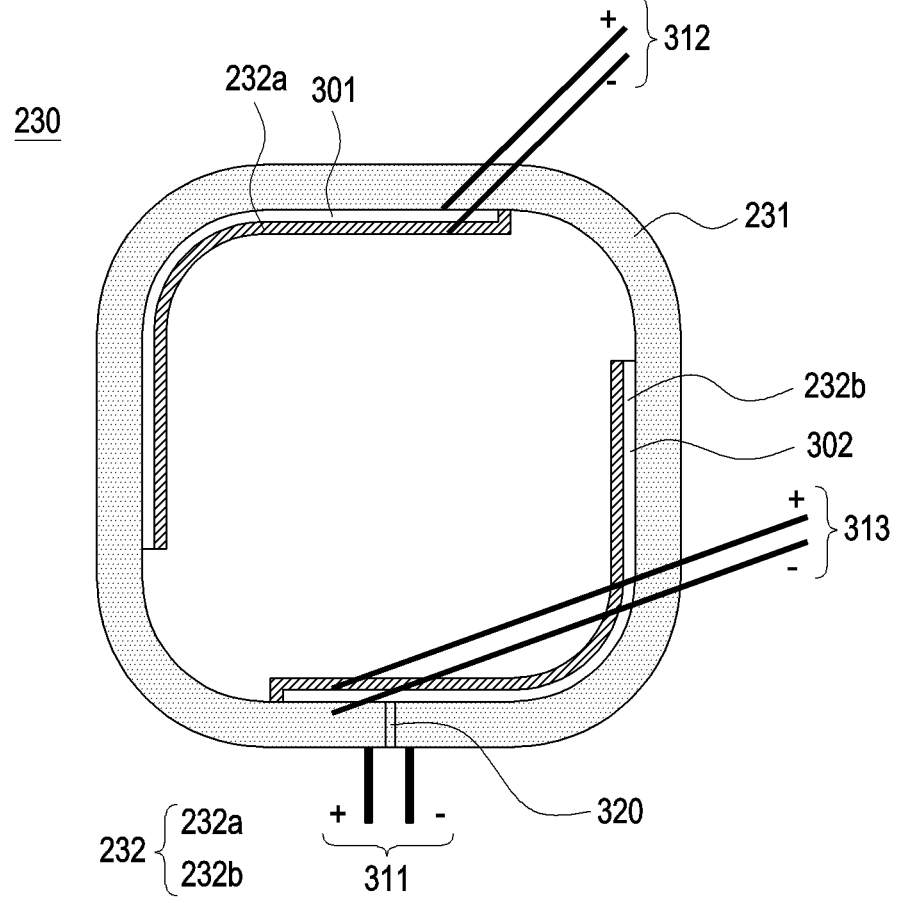
FIG. 3 is a diagram illustrating an antenna of a transmission resonator according to various embodiments.

FIG. 3 is a diagram illustrating an antenna of a transmission resonator according to various embodiments.

Referring to FIG. 3, the resonator body 230 may include at least one resonator 231 and at least one antenna 232. The resonator 231 may be configured by stacking a plurality of coils (e.g., five coils). A slit 320 may be formed in a lower end of the resonator 231. At least one capacitor (e.g., a 100 pF capacitor) may be connected to the slit 320 formed in the lower end of the resonator 231. A first port 311 may be connected to the slit 320 formed in the lower end of the resonator 231. The first port 311 may be connected to the matching circuit 213 described in connection with FIG. 2. According to various embodiments, the resonator 231 may transmit power to the electronic device 150 by forming a magnetic field by the signal corresponding to the first frequency (e.g., 6.78 MHz) transmitted through the first port 311. The resonator 231 may play a role to wirelessly transmit power as described above and be used for sensing a conductor or metal.

According to various embodiments, the wireless power transmitting device 160 may have at least one antenna 232 in the position adjacent to the resonator 231. Referring to FIG. 3, the wireless power transmitting device 160 may have an opening as viewed from above the loop shape of the resonator 231, and two antennas 232a and 232b may be disposed inside the resonator 231. For example, a first antenna 232a may be disposed on a first surface inside the resonator 231, and a second antenna 232b may be disposed on a second surface inside the resonator 231. The first surface and the second surface may be surfaces facing each other. FIG. 3 illustrates by way of non-limiting example that the two antennas 232a and 232b are disposed on surface facing each other. According to various embodiments, the number of antennas 232 disposed adjacent to the resonator 231, the position (e.g., inside or outside the resonator 231) in which the antenna 232 is disposed, and the direction of the antenna 232 may be set to be varied.

According to various embodiments, a first terminal of a second port 312 may be connected to a portion of the first antenna 232a. A second terminal of the second port 312 may be connected to the resonator 231. The second terminal of the second port 312 may be connected to the resonator 231 and play a role as a ground. The first antenna 232a may be disposed adjacent to the inside of the resonator 231 and be disposed to correspond to the shape of the transmission resonator 231. For example, the first antenna 232a may be disposed in a shape curved along the shape of the resonator 231, inside the resonator 231. The wireless power transmitting device 160 may transmit, through the first antenna 232a, the signal corresponding to the second frequency (e.g., 400 MHz) through the second port 312. According to various embodiments, a first dielectric substrate 301 may be disposed between the first antenna 232a and the resonator 231. The first antenna 232a may be used to sense whether a human body is present or approaches as described above.

According to various embodiments, a first terminal of a third port 313 may be connected to a portion of the second antenna 232b. A second terminal of the third port 313 may be connected to the resonator 231. The second terminal of the third port 313 may be connected to the resonator 231 and play a role as a ground. The second antenna 232b may be disposed adjacent to the inside of the resonator 231 and be disposed to correspond to the shape of the transmission resonator 231. For example, the second antenna 232b may be disposed in a shape curved along the shape of the resonator 231, inside the resonator 231. The wireless power transmitting device 160 may transmit, through the second antenna 232b, the signal corresponding to the second frequency or the third frequency through the third port 313. According to various embodiments, a second dielectric substrate 302 may be disposed between the second antenna 232b and the resonator 231. The second antenna 232b may be used to sense whether a human body is present or approaches as described above.

Figure 4:
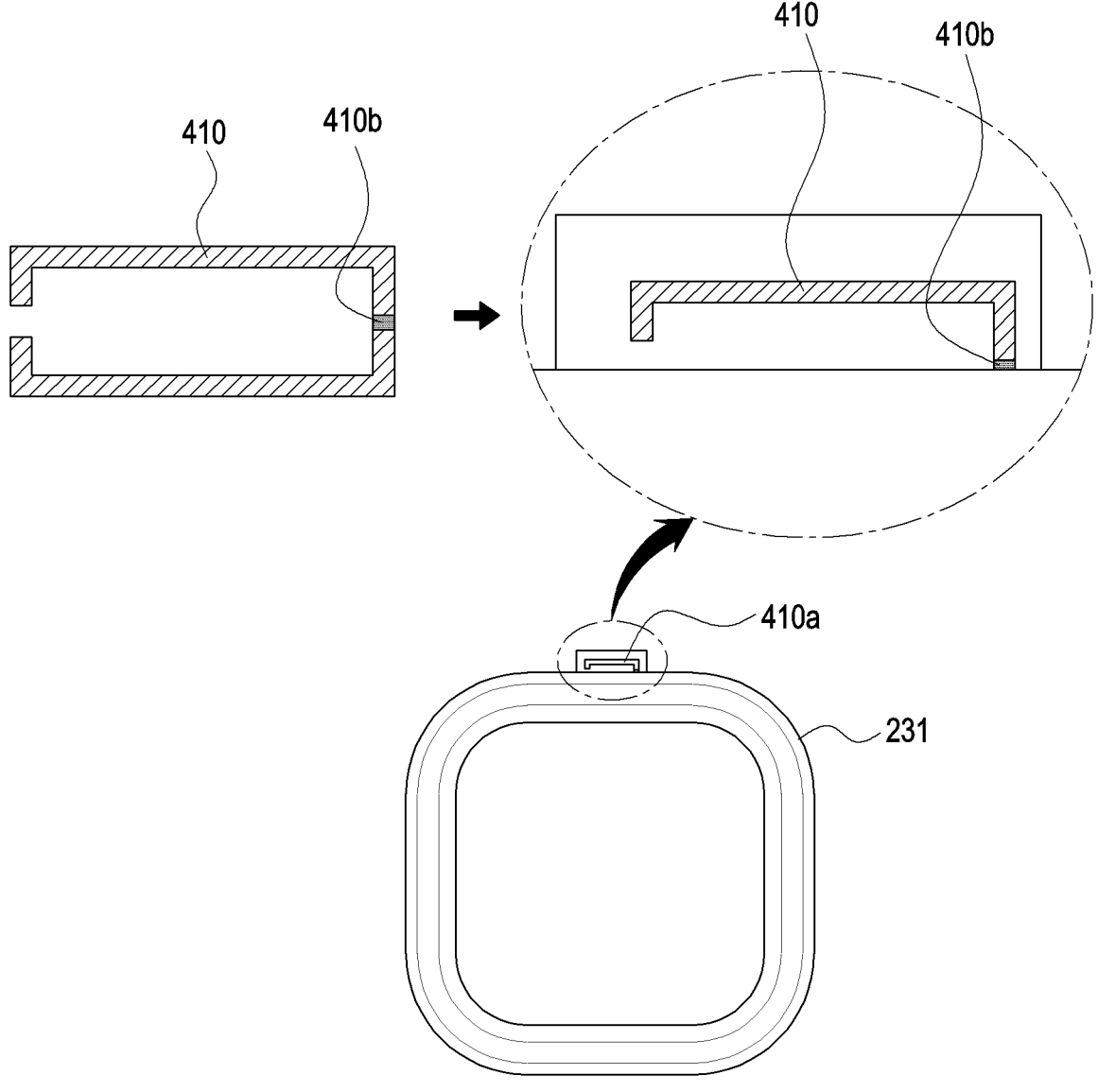
FIG. 4 is a diagram illustrating a form of an antenna according to various embodiments.

FIG. 4 is a diagram illustrating a form of an antenna according to various embodiments.

Referring to FIG. 4, at least one antenna 232 described above may implemented using a split ring resonator (SRR) antenna or at least a partial shape of the SRR antenna. For example, the antenna 232 may be configured in a semi-spherical shape corresponding to one side of the symmetrical axis of the SRR antenna 410 and be disposed adjacent to the resonator 231. For example, the antenna 232 may have a 'C' shape. According to various embodiments, the SRR antenna 410 may be fixedly disposed on the substrate 410a, and an end of the SRR antenna 410 may be disposed to form a space 410b apart from the resonator 231 by a predetermined gap.

According to various embodiments, a tab may be formed on one end of the SRR antenna 410, which is disposed to form the space 410b apart from the resonator 231 by the predetermined gap, and be connected with the above-described first terminal of the second port 312. The second terminal of the second port 312 may be connected to the resonator 231 and function as a ground.

Figure 5:
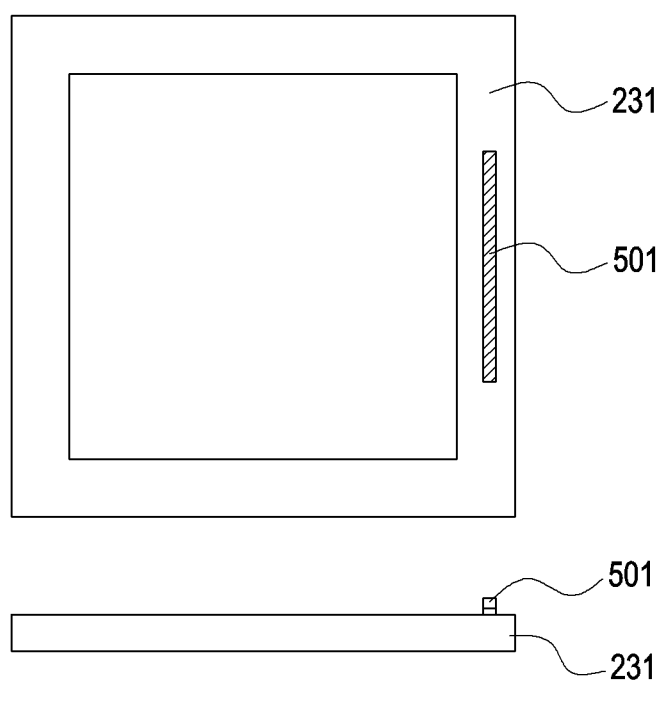
FIG. 5 is a diagram illustrating a form in which an antenna is disposed in a transmission resonator according to various embodiments.

FIG. 5 is a diagram illustrating a form in which an antenna is disposed in a transmission resonator according to various embodiments.

Referring to FIG. 5, the wireless power transmitting device 160 may have an opening as viewed from above the loop shape of the resonator 231, and an antenna 501 may be disposed on one side of the resonator 231. For example, as the loop shape of the resonator 231 is viewed from above, the antenna 501 may be disposed on a front of a side of the resonator 231. According to various embodiments, it is possible to sense the human body using the side surface of the antenna 501 by becoming the front surface of the resonator 231.

Figure 6:
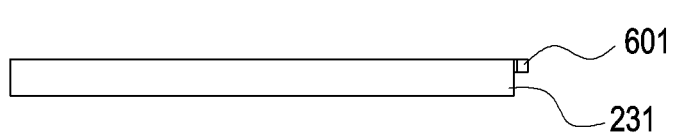
FIG. 6 is a diagram illustrating a form in which an antenna is disposed in a transmission resonator according to various embodiments.

FIG. 6 is a diagram illustrating a form in which an antenna is disposed in a transmission resonator according to various embodiments.

Referring to FIG. 6, the wireless power transmitting device 160 may have an opening as viewed from above the loop shape of the resonator 231, and an antenna 601 may be disposed on one outer side of the resonator 231. For example, as the loop shape of the resonator 231 is viewed from above, the antenna 601 may be disposed on a front of an outer right side of the resonator 231. According to various embodiments, it is possible to sense the human body using the front surface of the antenna 601 by becoming the front surface of the resonator 231.

According to various embodiments, the antenna 601 may implemented using a split ring resonator (SRR) antenna or at least a partial shape of the SRR antenna. For example, the antenna 601 may be configured in a semi-spherical shape corresponding to one side of the symmetrical axis of the SRR antenna and be disposed adjacent to the resonator 231. According to various embodiments, the antenna 232 may have an inverted F antenna (IFA) shape. For example, a stub 601*b* may be additionally formed in the half shape of the SRR antenna. The stub 601*b* extending from one side of the antenna 601 may be connected to the resonator 231 and be used for impedance matching.

According to various embodiments, the antenna 601 may be fixedly disposed on a substrate 601*a*, and an end of the antenna 601 may be disposed to form a space apart from the resonator 231 by a predetermined gap. The end of the antenna 601 may be connected with the first terminal 601*b* of the second port.

Figure 7:
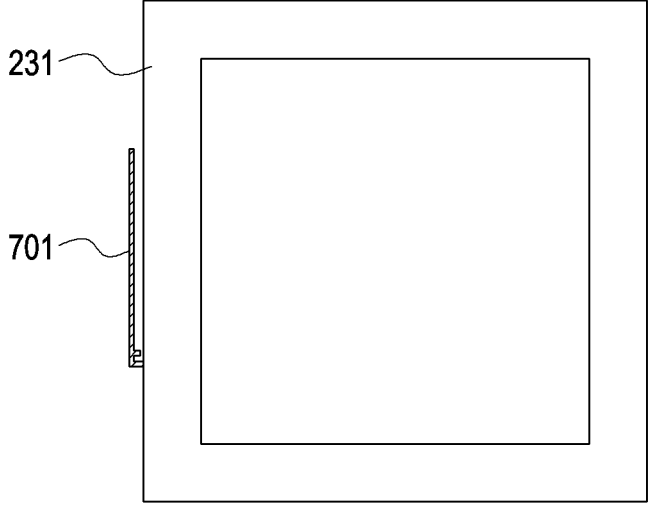
FIG. 7 is a diagram illustrating a form in which an antenna is disposed in a transmission resonator according to various embodiments.

FIG. 7 is a diagram illustrating a form in which an antenna is disposed in a transmission resonator according to various embodiments.

Referring to FIG. 7, the wireless power transmitting device 160 may have an opening as viewed from above the loop shape of the resonator 231, and an antenna 701 may be disposed on one outer side of the resonator 231. For example, as the loop shape of the resonator 231 is viewed from above, the antenna 701 may be disposed on a front of an outer left side of the resonator 231. According to various embodiments, it is possible to sense the human body using the front surface of the antenna 701 while becoming the front surface of the resonator 231. According to various embodiments, as compared with the antenna 601 shown in FIG. 6, the antenna 701 shown in FIG. 7 may differ in the position and direction of placement.

Figure 8:
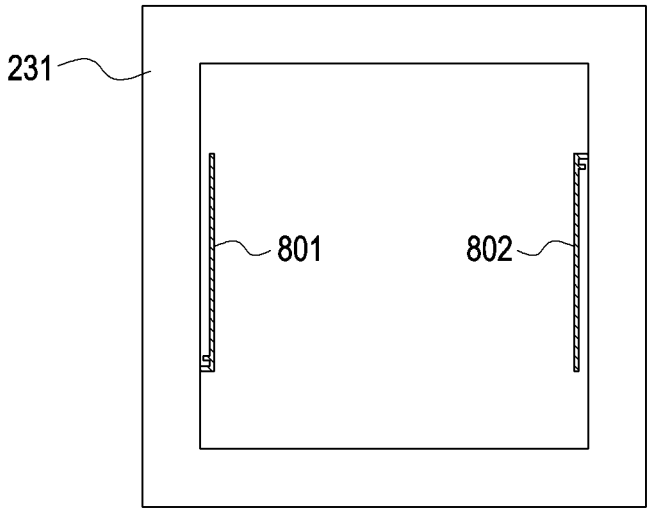
FIG. 8 is a diagram illustrating a form in which an antenna is disposed in a transmission resonator according to various embodiments.

FIG. 8 is a diagram illustrating a form in which an antenna is disposed in a transmission resonator according to various embodiments.

Referring to FIG. 8, the wireless power transmitting device 160 may have an opening as viewed from above the loop shape of the resonator 231, and an antenna 801 and/or 802 may be disposed on one inner side of the resonator 231. For example, as the loop shape of the resonator 231 is viewed from above, a first antenna 801 may be disposed on an inner left side of the resonator 231. As the loop shape of the resonator 231 is viewed from above, a second antenna 802 may be disposed on an inner right side of the resonator 231. According to various embodiments, it is possible to sense the human body using the front surface of the antenna 801 and/or 802 by becoming the front surface of the resonator 231. According to various embodiments, as compared with the antenna 601 or 701 shown in FIG. 6 or 7, the antenna 801 and/or 802 shown in FIG. 8 may differ in the position and direction of placement.

Figure 9:
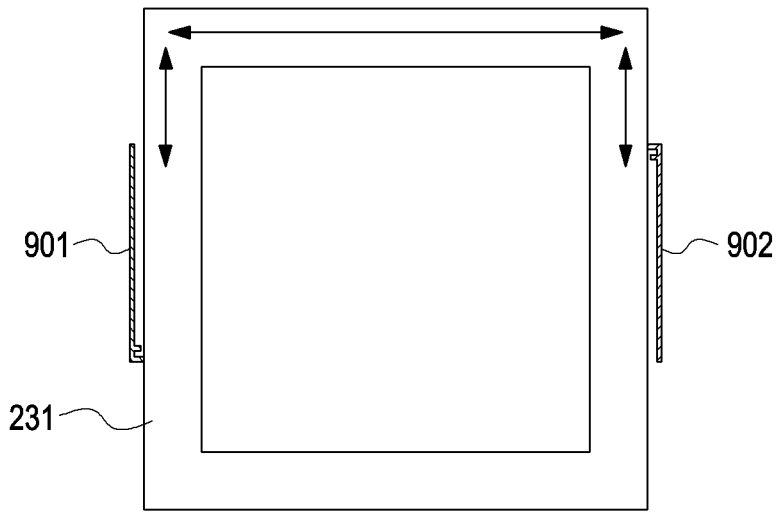
FIG. 9 is a diagram illustrating a form in which an antenna is disposed in a transmission resonator according to various embodiments.

FIG. 9 is a diagram illustrating a form in which an antenna is disposed in a transmission resonator according to various embodiments.

Referring to FIG. 9, the wireless power transmitting device 160 may have an opening as viewed from above the loop shape of the resonator 231, and an antenna 901 and/or 902 may be disposed on one outer side of the resonator 231.

For example, as the loop shape of the resonator 231 is viewed from above, a first antenna 901 may be disposed on an outer left side of the resonator 231. As the loop shape of the resonator 231 is viewed from above, a second antenna 902 may be disposed on an outer right side of the resonator 231. According to various embodiments, it is possible to sense the human body using the front surface of the antenna 901 and/or 902 by becoming the front surface of the resonator 231. According to various embodiments, as compared with the antenna 601, 701, 801, or 802 shown in FIG. 6, 7, or 8, the antenna 901 or 902 shown in FIG. 9 may differ in the position and direction of placement.

Figure 10:
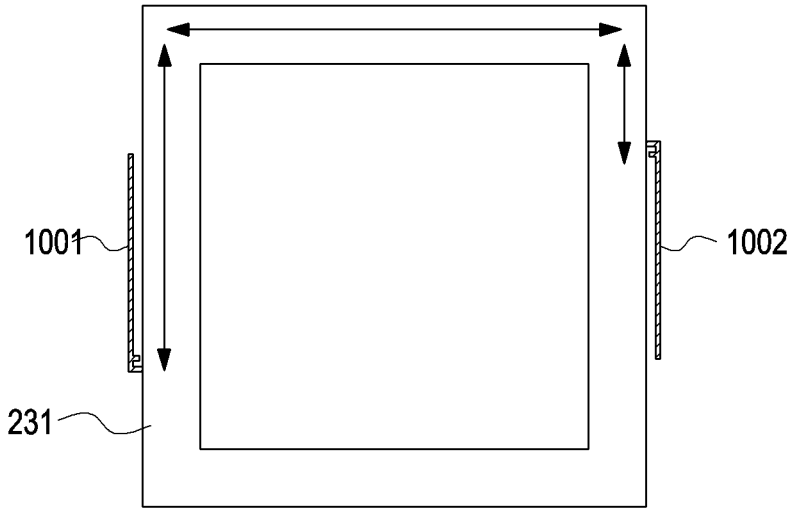
FIG. 10 is a diagram illustrating a form in which an antenna is disposed in a transmission resonator according to various embodiments.

FIG. 10 is a diagram illustrating a form in which an antenna is disposed in a transmission resonator according to various embodiments.

Referring to FIG. 10, the wireless power transmitting device 160 may have an opening as viewed from above the loop shape of the resonator 231, and an antenna 1001 and/or 1002 may be disposed on one outer side of the resonator 231. For example, as the loop shape of the resonator 231 is viewed from above, a first antenna 1001 may be disposed on an outer left side of the resonator 231. As the loop shape of the resonator 231 is viewed from above, a second antenna 1002 may be disposed on an outer right side of the resonator 231. According to various embodiments, as the antennas 1001 and 1002 shown in FIG. 10 are compared with the antennas 901 and 902 shown in FIG. 9, the first antennas 901 and 1001 may have different directions, but the second antennas 902 and 1002 may have the same second direction.

Figure 11:
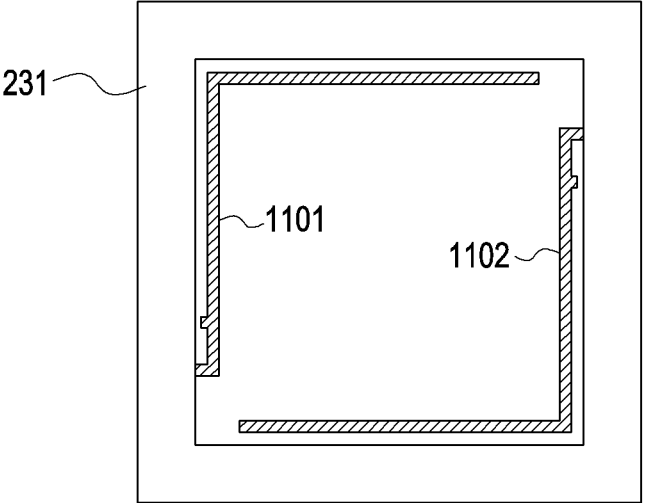
FIG. 11 is a diagram illustrating a form in which an antenna is disposed in a transmission resonator according to various embodiments.

FIG. 11 is a diagram illustrating a form in which an antenna is disposed in a transmission resonator according to various embodiments.

Referring to FIG. 11, the wireless power transmitting device 160 may have an opening as viewed from above the loop shape of the resonator 231, and an antenna 1101 and/or 1102 may be disposed on one inner side of the resonator 231. For example, as the loop shape of the resonator 231 is viewed from above, a first antenna 1101 may be disposed on a side surface extending upward from an inner left side of the resonator 231. As the loop shape of the resonator 231 is viewed from above, a second antenna 1102 may be disposed on a side surface extending downward from an inner right side of the resonator 231. According to various embodiments, it is possible to sense the human body using the front surface of the antenna 1101 and/or 1102 by becoming the front surface of the resonator 231.

Figure 12:
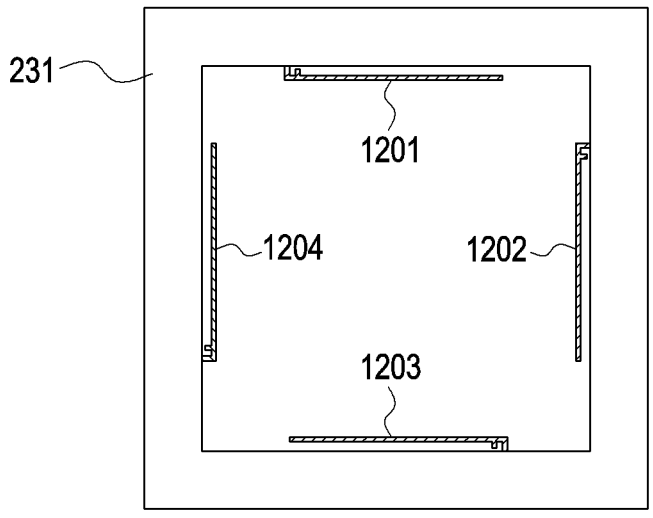
FIG. 12 is a diagram illustrating a form in which an antenna is disposed in a transmission resonator according to various embodiments.

FIG. 12 is a diagram illustrating a form in which an antenna is disposed in a transmission resonator according to various embodiments.

Referring to FIG. 12, the wireless power transmitting device 160 may have an opening as viewed from above the loop shape of the resonator 231, and an antenna 1201, 1202, 1203, and/or 1204 may be disposed on one inner side of the resonator 231. For example, as the loop shape of the resonator 231 is viewed from above, a first antenna 1201 may be disposed on an inner upper side of the resonator 231. As the loop shape of the resonator 231 is viewed from above, a second antenna 1202 may be disposed on an inner right side of the resonator 231. As the loop shape of the resonator 231 is viewed from above, a third antenna 1203 may be disposed on an inner lower side of the resonator 231. As the loop shape of the resonator 231 is viewed from above, a fourth antenna 1204 may be disposed on an inner left side of the resonator 231. According to various embodiments, it is possible to sense the human body using the front surface of the antenna 1202, 1202, 1203, and/or 1204 by becoming the front surface of the resonator 231.

Figure 13:
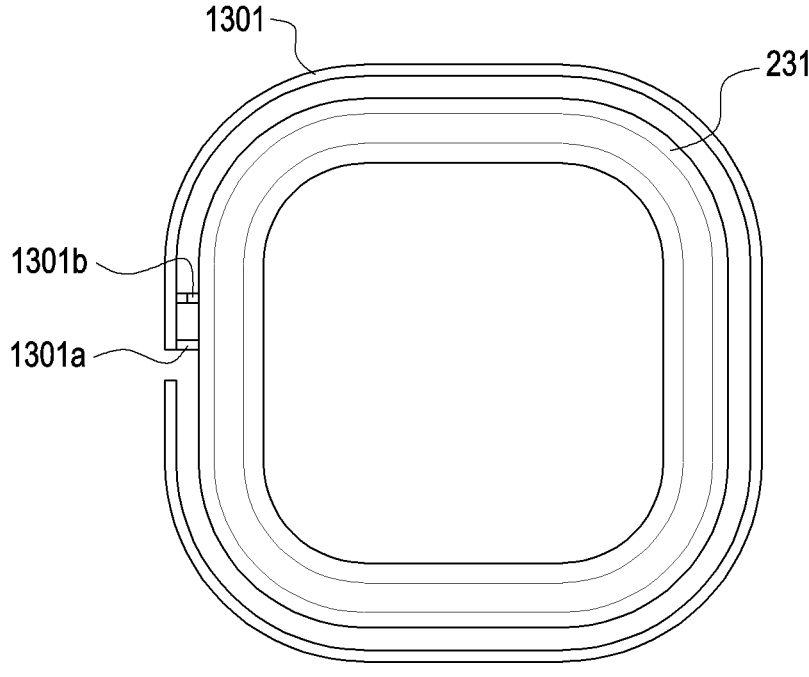
FIG. 13 is a diagram illustrating a form in which an antenna is disposed in a transmission resonator according to various embodiments.

FIG. 13 is a diagram illustrating a form in which an antenna is disposed in a transmission resonator according to various embodiments.

Referring to FIG. 13, the wireless power transmitting device 160 may have an opening as viewed from above the loop shape of the resonator 231, and an antenna 1301 may be disposed to externally surround the resonator 231 According to various embodiments, the antenna 1301 may have an IFA shape. For example, a stub 1301*a* may be additionally formed in the half shape of the SRR antenna. The stub 1301*a* extending from one side of the antenna 1301 may be connected to the resonator 231 and be used for impedance matching.

According to various embodiments, the antenna 1301 may be fixedly disposed on a substrate, and an end of the antenna 1301 may be disposed to form a space apart from the resonator 231 by a predetermined gap. The end of the antenna 1301 may be connected with the first terminal 1301*b* of the second port.

Described below are various simulation results in a context where the distance from a metal or a human body is varied when a signal corresponding to a specific frequency is transmitted, with reference to FIGS. 14A, 14B, 15, 16, 17, 18, and 19. The following-described simulation depicts whether an object (e.g., a metal or human body) approaches based on the variation in impedance or phase depending on the distance, but it is also possible to determine whether an object approaches by other parameters (e.g., Q-factor, reflection coefficient, reflection loss, coupling coefficient, or standing wave ratio) that may be measured when a signal is transmitted through the antenna, as well as impedance or phase, and embodiments of the disclosure are not limited to the following-described parameters.

Figure 14A:
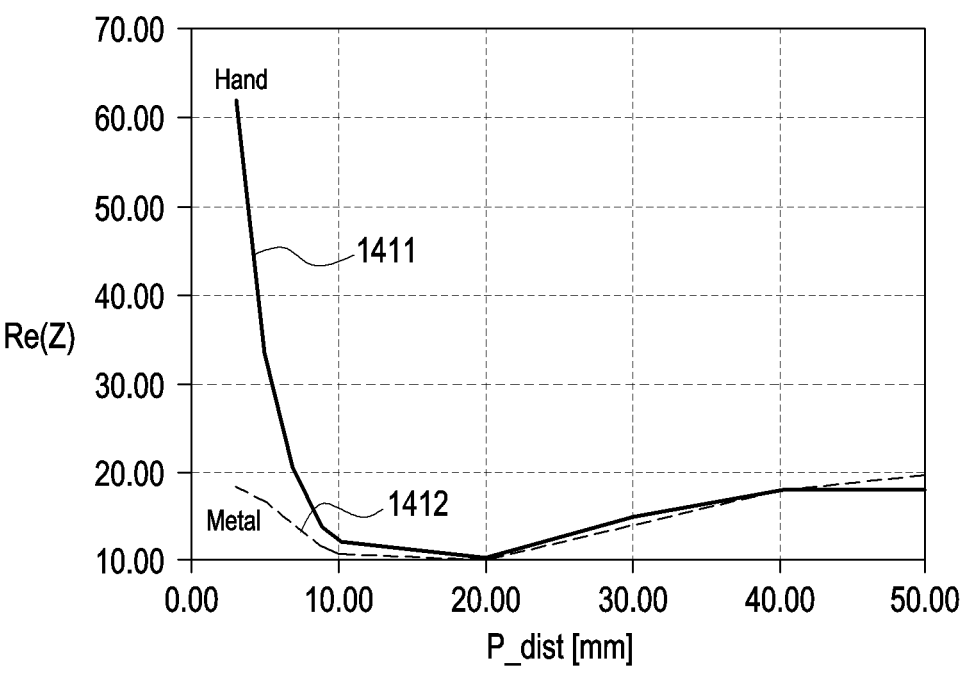
FIG. 14A is a graph illustrating an impedance varied by the distance according to various embodiments.

FIG. 14A is a graph illustrating an impedance varied by the distance according to various embodiments.

FIG. 14A is a graph showing the impedance that is varied depending on the distance when an object approaches the antenna 232 in a case where a signal corresponding to a second frequency (e.g., 2.4 GHz) is transmitted through the antenna 232 of the wireless power transmitting device 160 to form an electric field.

The graph 1411 shown by the solid line in FIG. 14A denotes the real number value of the impedance varied depending on the distance when a human body (e.g., hand) approaches the antenna. The graph 1412 shown by the dashed line denotes the real number value of the impedance varied depending on the distance when a metal approaches the antenna. Referring to FIGS. 14A, it may be identified that the hand and the metal show similar real number values of impedance when the distance from the antenna is 10 mm or more but, in an adjacent state in which the distance from the antenna is less than 10 mm, the difference in the real number value of impedance therebetween increases. For example, it may be identified that when the distance between the antenna and the metal is less than 5 mm, the real number value of impedance is less than 20 ohms but, when the distance between the antenna and the hand is less than 5 mm, the real number value of impedance is 60 ohms or more. For example, when an object approaches the antenna, it is possible to identify whether the object is the hand or the metal and whether the object approaches by transmitting a signal with the second frequency through the antenna to form an electric field and measuring the impedance as shown in FIG. 14A.

Figure 14B:
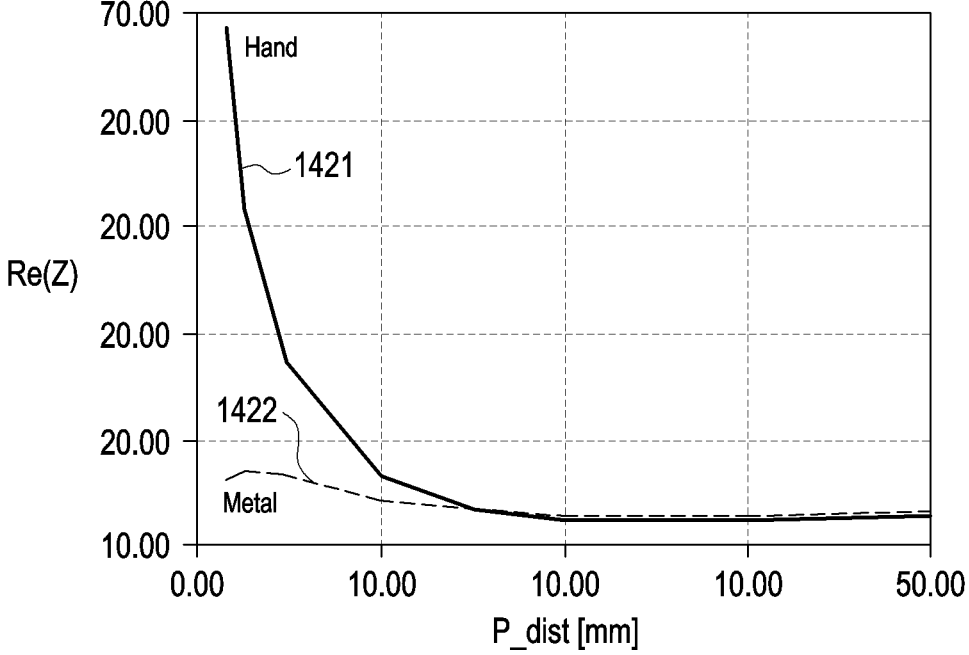
FIG. 14B is a graph illustrating an impedance varied by the distance according to various embodiments.

FIG. 14B is a graph illustrating an impedance varied by the distance according to various embodiments.

FIG. 14B is a graph showing the impedance that is varied depending on the distance when an object approaches the antenna 232 in a case where a signal corresponding to a third frequency (e.g., 0.9 GHZ), different from the second frequency in FIG. 14A, is transmitted through the antenna 232 of the wireless power transmitting device 160 to form an electric field.

The graph 1421 shown by the solid line in FIG. 14B denotes the real number value of the impedance varied depending on the distance when a human body (e.g., hand) approaches the antenna. The graph 1422 shown by the dashed line denotes the real number value of the impedance varied depending on the distance when a metal approaches the antenna. Referring to FIGS. 14B, it may be identified that the hand and the metal show similar real number values of impedance when the distance from the antenna is 30 mm or more but, in an adjacent state in which the distance from the antenna is less than 30 mm, the difference in the real number value of impedance therebetween increases. For example, it may be identified that in the case of the metal, the real number value of impedance is less than 20 ohms regardless of the distance from the antenna but, in the case of the hand, the real number value of impedance is sharply increased when the distance between the antenna and the hand is less than 20 mm. For example, when an object approaches the antenna, it is possible to identify whether the object is the hand or the metal and whether the object approaches by transmitting a signal with the third frequency through the antenna to form an electric field and measuring the impedance as shown in FIG. 14B.

Figure 15:
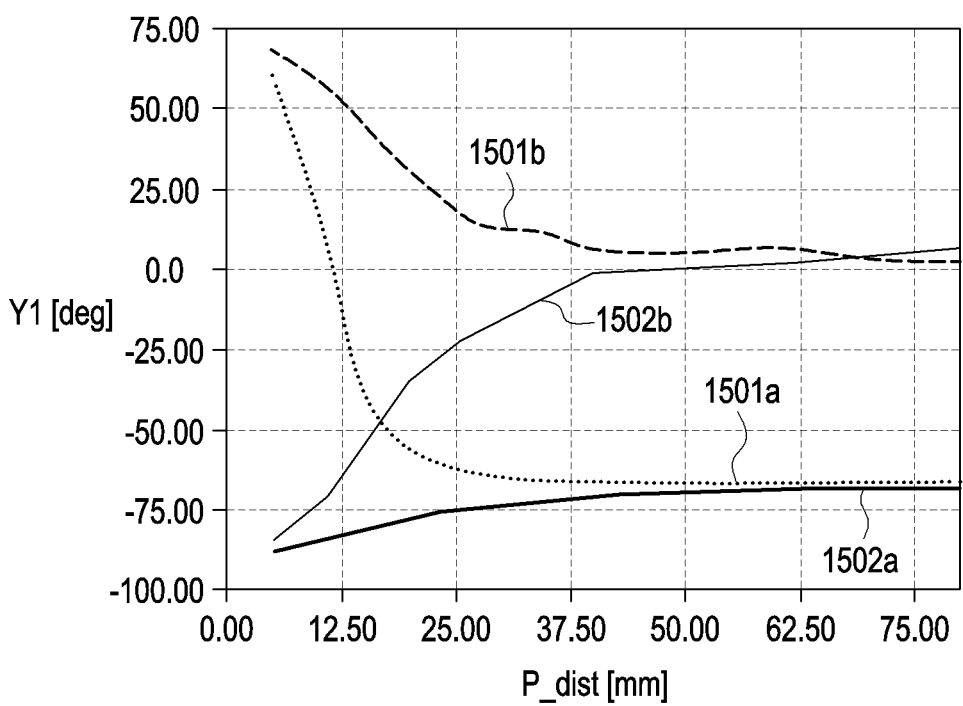
FIG. 15 is a graph illustrating a phase that is varied by the distance according to various embodiments.

FIG. 15 is a graph illustrating a phase varied by the distance according to various embodiments.

FIG. 15 is a graph showing the angle or phase of the impedance value that is varied depending on the distance when an object approaches the antenna 232 in a case where a signal corresponding to a fourth frequency (e.g., 0.95 GHz) is transmitted through the antenna 232 of the wireless power transmitting device 160 to form an electric field, and a signal corresponding to a fifth frequency (e.g., 0.98 GHz) is transmitted to form an electric field. The angle or phase of the impedance value may be calculated by Equation 1 below.

$$\text{Angle} = \arctan\frac{\text{Im}(Z_{in})}{\text{Re}(Z_{in})} \qquad \text{[Equation 1]}$$

The graphs 1501*a* and 1501*b* shown by the broken lines in FIG. 15 denote the angle or phase of the impedance varied depending on the distance when a human body (e.g., hand) approaches the antenna. The graphs 1502*a* and 1502*b* shown by the solid lines in FIG. 15 denote the angle or phase of the impedance varied depending on the distance when a human body (e.g., hand) approaches the antenna. For example, 1501*a* denotes the graph when the signal of 950 MHz is transmitted, and the hand approaches, and 1502*a* denotes the graph when the signal of 950 MHz is transmitted, and the metal approaches. 1501*b* denotes the graph when the signal of 980 MHz is transmitted, and the hand approaches, and 1502*b* denotes the graph when the signal of 980 MHz is transmitted, and the metal approaches.

Referring to FIG. 15, it may be identified that the difference in the angle or phase of impedance between the metal and the hand is larger when the frequency of the signal transmitted through the antenna in the distance less than 37.5 mm is 980 MHz than when the frequency is 950 MHz.

FIG. 16 is a graph illustrating a phase corresponding to a frequency for each frequency when a conductor approaches according to various embodiments. FIG. 17 is a graph illustrating a phase corresponding to a frequency for each frequency when a human body approaches according to various embodiments.

Referring to FIGS. 16 and 17, the respective graphs of FIGS. 16 and 17 are graphs having different distances. For example, the directions of the arrows indicated in FIGS. 16 and 17 denote graphs for the phase of the impedance value measured at each distance as a conductor approaches.

According to various embodiments, referring to FIG. 16, it may be identified that if the conductor approaches the antenna, the difference between the graphs respectively corresponding to the distances is not large. Referring to FIG. 17, it may be identified that when a human body approaches the antenna, the difference between the graphs respectively corresponding to the distances is relatively large as compared with the conductor. As described above, it is possible to transmit a signal corresponding to a set frequency through the antenna to form an electric field and identify whether the conductor approaches based on the angle or phase of the impedance value.

FIG. 18 is a graph illustrating a reflection coefficient corresponding to a frequency for each frequency when a conductor approaches according to various embodiments. FIG. 19 is a graph illustrating a reflection coefficient corresponding to a frequency for each frequency when a human body approaches according to various embodiments.

Referring to FIGS. 18 and 19, the respective graphs of FIGS. 18 and 19 are graphs having different distances. For example, the directions of the arrows indicated in FIGS. 18 and 19 denote graphs for the reflection coefficient S(1,1) measured at each distance as a conductor approaches.

According to various embodiments, referring to FIG. 18, it may be identified that if the conductor approaches the antenna, the difference between the graphs respectively corresponding to the distances is not large. Referring to FIG. 19, it may be identified that when a human body approaches the antenna, the difference between the graphs respectively corresponding to the distances is relatively large as compared with the conductor. As described above, it is possible to transmit a signal corresponding to a set frequency through the antenna to form an electric field and identify whether the conductor approaches based on the reflection coefficient.

According to various embodiments, the method for identifying whether a conductor or a human body approaches by comparing reflection coefficients has been described in connection with FIGS. 18 and 19, but it is also possible to determine whether an object approaches by other parameters (e.g., Q-factor, reflection loss, coupling coefficient, or standing wave ratio) that may be measured when a signal is transmitted through the antenna, as well as reflection coefficient, and embodiments of the disclosure are not limited to the above-described parameters.

FIG. 20 is a block diagram illustrating an example configuration of a wireless power transmitting device according to various embodiments.

Referring to FIG. 20, the wireless power transmitting device 160 may include a power amplifier 212 (e.g., an $EF_2$ inverter), a matching circuit 213, and a resonator 231. According to various embodiments, the $EF_2$ inverter corresponding to the power amplifier 212 may include an RF choke inductor ($L_f$) 3, a gate driver 5, a transistor 7, a shunt capacitor ($C_p$) 9, a first LC resonance circuit 11, and a second LC resonance circuit 13.

The transistor 7 may receive a DC voltage $V_{in}$, as a driving voltage, from an input power source 1 and operate. The transistor 7 may receive a pulsed (e.g., square wave) input signal through the input terminal (e.g., gate) from a gate driver 5, turning on or off. The transistor 7 may include a metal oxide semiconductor field effect transistor (MOSFET).

The RF choke inductor 3 may cut off transfer of an RF signal from the input power source 1 to the transistor 7 so that only DC current is transferred to the transistor 7.

The shunt capacitor 9 may be connected in parallel with the transistor 7 and be discharged or charged while the transistor 7 is on or off. The shunt capacitor 9 may be a separate capacitor connected in parallel with the transistor 7 and may be described as a concept including the internal capacitance (e.g., the drain-source capacitance $C_{ds}$) of the transistor 7.

An RF signal (or RF power) may be generated based on the turn-on or off of the transistor 7 by receiving an input signal from the gate driver 5. The generated RF signal may be a signal having an operating frequency corresponding to the input signal input from the gate driver 5 to the gate of the transistor 7. For example, when the wireless power transmitting device transmits wireless power according to a resonance scheme standard, the operating frequency may be 6.78 MHz, but is not limited thereto. The RF signal or RF power may be transferred to the first LC resonance circuit 11 and/or the second LC resonance circuit 13 through the output terminal of the transistor 7. For example, if the transistor 7 is turned on (e.g., if the transistor 7 is saturated), the transistor 7 may be electrically shorted and be interpreted as a short circuit for the ground connected with the source, and the voltage of the output terminal may be interpreted as 0. As the transistor 7 is turned on, the current flowing through the RF chock inductor 3 to the transistor 7 may gradually increase. Thereafter, if the transistor 7 is turned off, the current flowing through the RF choke inductor 3 may be oriented to the shunt capacitor 9 and, as the shunt capacitor 9 is gradually charged, the voltage at the output terminal of the transistor 7 (e.g., the voltage between both the terminals of the shunt capacitor 9) may increase as it reaches the maximum value. Thereafter, as the shunt capacitor 9 is gradually discharged, current flows from the shunt capacitor 9 through the output terminal of the transistor 7 to the first LC resonance circuit 11 and/or the second LC resonance circuit 13, so that the voltage between both the terminals of the shunt capacitor 9 may gradually decrease. The transistor 7, the shunt capacitor 9, and the input signal may be set so that before the transistor 7 turns off and then turns back on (e.g., before current starts to flow again through the RF choke inductor 3 to the transistor 7), the voltage at the output terminal of the transistor 7 (e.g., the voltage between both the terminals of the shunt capacitor 9 and the drain-source voltage of the transistor 7) may gradually decrease to 0, and the variation in the reduction of the voltage at the output terminal of the transistor 7 is 0. Thereafter, if the transistor 7 is turned back on, the current flowing through the RF choke inductor 3 may be oriented to the transistor 7 and, while the transistor 7 is on, the voltage at the output terminal of the transistor 7 may remain 0. As described above, while the transistor 7 is in an on state, the voltage at the output terminal of the transistor 7 is 0 and, while the transistor 7 is in an off state, the current flowing through the RF choke inductor 3 is oriented to the shunt capacitor 9, so that the current flowing through the RF choke inductor 3 to the transistor 7 is 0 (in other words, since the period during which the voltage at the output terminal of the transistor 7 is not zero (non-zero) does not overlap the period during which the drain-source current is not zero). Thus, the power consumed from the transistor 7 may be ideally zero. However, in a non-ideal case, since the transistor 7 generates RF power based on being turned on or off, the generated RF power has a second and higher harmonic frequency components, as well as the desired frequency component (e.g., the fundamental component of the operating frequency). The duty cycle of the transistor 7 may be set to, e.g., 50%, based on the input signal.

The first LC resonance circuit 11 may be connected in parallel with the transistor 7. The first LC resonance circuit 11 may include a first inductor ($L_{mr}$) 11a (e.g., a coil) and a first capacitor ($C_{mr}$) 11b connected in series with each other. The first inductor 11a and the first capacitor 11b may have proper element values that allow the resonant frequency of the first LC resonance circuit 11 to correspond to the second harmonic frequency ($2f_s$) of the operating frequency ($f_s$) of the input signal. The first LC resonance circuit 11 may be interpreted electrically as a short circuit at the second harmonic frequency ($2f_s$). The first LC resonance circuit 11 may be operated as a second harmonic filter (e.g., a band-stop filter) that prevents the second harmonic component of the RF power generated from the transistor 7 from being transferred to the second LC resonance circuit 13 based on being electrically shorted at the second harmonic frequency ($2f_s$).

The second LC resonance circuit 13 may be connected in series to the output terminal of the transistor 7. The second LC resonance circuit 13 may include a second capacitor ($C_o$) 13a and a second inductor ($L_o$) 13b connected in series with each other. The second capacitor 13a and the second inductor 13b may have proper element values that allow the resonant frequency of the second LC resonance circuit 13 to correspond to the operating frequency ($f_s$) of the input signal (e.g., to correspond to the fundamental frequency (or the first harmonic frequency) ($f_s$)). The second LC resonance circuit 13 may be interpreted electrically as a short circuit at the first harmonic frequency ($f_s$). The second LC resonance circuit 13 may be operated as a band-pass filter (or low-pass filter) that passes the fundamental component (or first harmonic component) (e.g., the component corresponding to the operating frequency) of the RF power generated from the transistor 7 based on being electrically shorted at the first harmonic frequency ($f_s$).

The matching circuit 213 may be connected in series to the second LC resonance circuit 13. The matching circuit 213 may provide impedance matching that allows the output impedance (e.g., the impedance to the second LC resonance circuit 13) to match the impedance of the load ($Z_L$) 17. The matching circuit 213 may include, e.g., at least one low-pass filter and/or a band-stop filter, and the low-pass filter may include at least one capacitor.

The load 17 may include at least one hardware component (e.g., a circuit element) that receives the RF power generated by the power amplifier 10 (e.g., an $EF_2$ inverter) or receives the RF power and operates. For example, the load 17 may include a hardware component (e.g., a transmission coil) of the wireless power transmitting device (e.g., the electronic device) including an $EF_2$ inverter and/or a receiving device (e.g., the wireless power receiving device or wireless power receiver) receiving power from the magnetically coupled electronic device.

FIG. 21 is a block diagram illustrating an example configuration of a wireless power transmitting device according to various embodiments.

Referring to FIG. 21, a wireless power transmitting device 160 may include a controller (e.g., including processing and/or control circuitry) 211, a signal generator 214, a sensing circuit 215, and an antenna 232. The sensing circuit 215 may sense at least part of the signal generated by the signal generator 214 and/or the signal transmitted from the antenna 232, by a coupler 110.

According to various embodiments, the sensing circuit 215 may include the coupler 110, a first attenuator 111a, a second attenuator 111b, a first splitter 112a, a second splitter 112b, a forward power detector 113, a reflected power detector (or backward power detector) 114, a waveform converter 115, and a phase detector 116, each of which include various circuitry. According to various embodiments, as is shown in FIG. 23 described in greater detail below, at least one of the first attenuator 111a, the second attenuator 111b, the first splitter 112a, the second splitter 112b, the forward power detector 113, and the reflected power detector 114 may be omitted from the impedance sensing circuit 108, and the signal coupled by the coupler 110 may be directly input to the waveform converter 115.

According to various embodiments, the input port of the coupler 110 (hereinafter, referred to as a 'first port' for convenience) may be connected to the plus (+) terminal of the signal generator 214, and the output port of the coupler 110 (hereinafter, referred to as a 'second port') may be connected to one end of the antenna 232. The minus (−) terminal of the signal generator 214 may be connected to the other end of the antenna 232. The signal input to the input port (first port) of the coupler 110 (hereinafter, referred to as a 'forward signal' for convenience) may be coupled in the coupler 110 and be input to the first attenuator 111a through a first coupling port (hereinafter, referred to as a 'third port' for convenience). The reflected signal input through the output port (second port) of the coupler 110 (hereinafter, referred to as a 'backward signal' for convenience) may be coupled in the coupler 110 and be input to the second attenuator 111b through a second coupling port (hereinafter, referred to as a 'fourth port' for convenience).

According to various embodiments, the signal output through the third port of the coupler 110 may be input to the first attenuator 111a, and the first attenuator 111a may attenuate the input signal and output it to the first splitter 112a. The signal output through the fourth port of the coupler 110 may be input to the second attenuator 111a, and the second attenuator 111b may attenuate the input signal and output it to the second splitter 112b. The signal input to the first splitter 112a may be output as a first forward signal and a second forward signal, and the first forward signal may be input to the waveform converter 115, and the second forward signal may be input to the forward power detector 113. The signal input to the second splitter 112b may be output as a first backward signal (first reflected signal) and a second backward signal (second reflected signal), and the first backward signal may be input to the waveform converter 115, and the second backward signal may be input to the reflected power detector (or backward power detector) 114.

According to various embodiments, the waveform converter 115 may receive the first forward signal output from the first splitter 112a and the first backward signal output from the second splitter 112b and output a voltage waveform signal and a current waveform signal. The voltage waveform signal and the current waveform signal output from the waveform converter 115 may be input to the phase detector 116. The phase detector 116 may receive the voltage waveform signal and the current waveform signal output from the waveform converter 115 and may output a voltage V_phs corresponding to a phase difference between the voltage waveform signal and the current waveform signal. A voltage corresponding to the phase difference output from the phase detector 116 may be input to the controller 211.

According to various embodiments, the controller 211 may receive the voltage V_phs corresponding to the phase difference between the voltage waveform signal and the current waveform signal output from the phase detector 116 and identify a variation in impedance based on the voltage V_phs corresponding to the input phase difference. The controller 211 may identify whether a conductor or human body is present or approaches based on the identified variation in impedance.

According to various embodiments, the forward power detector 113 may receive the second forward signal output from the first splitter 112a and detect the magnitude of the forward power. For example, the forward power detector 113 may detect the magnitude of the power of the input second forward signal and output the voltage V_fwd of the forward signal. The voltage V_fwd of the forward signal output from the forward power detector 113 may be input to the controller 211. The reflected power detector 114 may receive the second backward signal (the second reflected signal) output from the second splitter 112b to detect the magnitude of the backward power. For example, the reflected power detector 114 may detect the magnitude of the power of the input second backward signal and output the voltage V_ref of the backward signal (reflected signal). The voltage V_ref of the backward signal (reflected signal) output from the reflected power detector 114 may be input to the controller 211. According to various embodiments, the controller 211 may identify the variation in impedance based on the voltage V_fwd of the forward signal output from the forward power detector 113 and the voltage V_ref of the backward signal (reflected signal) output from the reflected power detector 114. The controller 211 may identify whether a conductor or human body is present or approaches based on the identified variation in impedance.

FIG. 22 is a block diagram illustrating an example configuration of a wireless power transmitting device according to various embodiments.

Referring to FIG. 22, as described above, the signal (e.g., forward signal) coupled at the first port 2211 (P1) of the coupler 110 may be output through the third port 2213 (P3). The signal output through the third port 2213 may be input to the waveform converter 115 through the first attenuator 111a and the first splitter 112a. According to various embodiments, the first attenuator 111a and/or the first splitter 112a may be omitted. The signal (e.g., reflected signal or backward signal) coupled at the third port 2213 (P3) of the coupler 110 may be output through the fourth port 2214 (P4). The signal output through the fourth port 2214 may be input to the waveform converter 115 through the second attenuator 111b and the second splitter 112b. According to various embodiments, the second attenuator 111b and/or the second splitter 112b may be omitted.

According to various embodiments, the output signal of the first splitter 112a and the output signal of the second splitter 112b, input to the waveform converter 115, may output a voltage waveform signal and a current waveform signal based on the difference or sum of the two signals (e.g., by adding or subtracting the two signals). The voltage waveform signal and the current waveform signal output from the waveform converter 115 may be input to the phase detector 116. The phase detector 116 may receive the voltage waveform signal and the current waveform signal output from the waveform converter 115 and may output a voltage V_phs corresponding to a phase difference between the voltage waveform signal and the current waveform signal. A voltage corresponding to the phase difference output from the phase detector 116 may be input to the controller 211.

FIG. 23 is a block diagram illustrating an example configuration of a wireless power transmitting device according to various embodiments.

Referring to FIG. 23, the signal (e.g., forward signal) coupled at the first port (P1) 2211 of the coupler 110 may be output through the third port (P3) 2213 and be input to the first attenuator 111a. The signal attenuated by the first attenuator 111a may be input to an adder circuit 2310 and a subtractor circuit 2320 of the waveform converter 115. The signal (e.g., backward signal or reflected signal) coupled at the second port (P2) 2212 of the coupler 110 may be output through the fourth port (P4) 2214 and be input to the second attenuator 111b. The signal attenuated by the second attenuator 111b may be input to the adder circuit 2310 and the subtractor circuit 2320 of the waveform converter 115.

According to various embodiments, the adder circuit 2310 may output a current waveform signal based on the sum of the signals output from the first attenuator 111a and the second attenuator 111b. The subtractor circuit 2320 may output a voltage waveform signal based on the difference of the signals output from the first attenuator 111a and the second attenuator 111b.

FIG. 24 is a block diagram illustrating an example configuration of a wireless power transmitting device according to various embodiments.

Referring to FIG. 24, the signal (e.g., forward signal) coupled at the first port (P1) 2211 of the coupler 110 may be output through the third port (P3) 2213 and be input to the first attenuator 111a. The signal attenuated by the first attenuator 111a may be input to the first splitter 112a. The first splitter 112a may distribute the input signal to the forward power detector 113 and the waveform converter 115. For example, the signal output from the first splitter 112a may be input to the adder circuit 2310 and the subtractor circuit 2320 of the waveform converter 115. The signal (e.g., backward signal or reflected signal) coupled at the second port (P2) 2212 of the coupler 110 may be output through the fourth port (P4) 2214 and be input to the second attenuator 111b. The signal attenuated by the second attenuator 111b may be input to the second splitter 112b. The second splitter 112b may distribute the input signal to the reflected power detector 114 and the waveform converter 115. For example, the signal output from the second splitter 112b may be input to the adder circuit 2310 and the subtractor circuit 2320 of the waveform converter 115.

According to various embodiments, the adder circuit 2310 may output a current waveform signal based on the sum of the signals output from the first splitter 112a and the second splitter 112b. The subtractor circuit 2320 may subtract the signals output from the first splitter 112a and the second splitter 112b to output a voltage waveform signal.

FIG. 25 is a block diagram illustrating an example configuration of a wireless power transmitting device according to various embodiments.

Referring to FIG. 25, according to various embodiments, the current waveform signal output through the waveform converter 115 may output a signal, zero-crossed through a first zero-crossing detector 2510, and then input it to the phase detector 116. The voltage waveform signal output through the waveform converter 115 may output a signal, zero-crossed through a second zero-crossing detector 2520, and then input it to the phase detector 116.

According to various example embodiments, a wireless power transmitting device may comprise: a power amplifier, a transmission resonator including a coil, and configured to receive an electrical signal corresponding to a first frequency, output through the power amplifier, and to form a magnetic field by the received electrical signal corresponding to the first frequency to transmit power, an antenna configured in a shape corresponding to any one side of a symmetrical axis of a split ring resonator (SRR) antenna, disposed adjacent to the transmission resonator, and configured to receive a signal corresponding to a second frequency, a sensing circuit configured to sense at least part of the signal corresponding to the second frequency transmitted to the antenna, and a controller configured to identify whether a human body approaches, at least based on a signal sensed through the sensing circuit. A first terminal of the sensing circuit may be connected to a first portion of the antenna, and a second terminal of the sensing circuit may be connected to the coil of the transmission resonator.

According to various example embodiments, the controller may be configured to identify whether the human body approaches, based on a variation in impedance of the signal sensed through the sensing circuit.

According to various example embodiments, the controller may be configured to identify whether the human body approaches, based on a phase of the signal sensed through the sensing circuit.

According to various example embodiments, the controller may be configured to identify whether the human body approaches, based on a change in at least one of a Q-factor, reflection coefficient, reflection loss, coupling coefficient, or standing wave ratio of the signal sensed through the sensing circuit.

According to various example embodiments, the controller may be configured to identify whether a conductor approaches based on the electrical signal corresponding to the first frequency transmitted through the transmission resonator.

According to various example embodiments, the antenna may be disposed adjacent to an inner side of the transmission resonator.

According to various example embodiments, the antenna may be disposed adjacent to the inner side of the transmission resonator to correspond to a shape of the coil of the transmission resonator.

According to various example embodiments, the antenna may include a first antenna and a second antenna. The second antenna may be disposed opposite to the first antenna.

According to various example embodiments, the antenna may be disposed adjacent to an outer side of the transmission resonator.

According to various example embodiments, the first frequency may be greater than the second frequency.

According to various example embodiments, the antenna may form a stub in a second portion of the antenna to form an inverted F antenna (IFA) shape.

According to various example embodiments, the stub may be connected to the transmission resonator to perform impedance matching.

According to various example embodiments, a method for detecting an approaching object (foreign object) by a wireless power transmitting device may comprise: transmitting power by forming a magnetic field by an electrical signal corresponding to a first frequency, output through a power amplifier, by a transmission resonator including a coil; identifying whether a conductor approaches, at least based on a signal sensed from the electrical signal corresponding to the first frequency, by a controller; transmitting a signal corresponding to a second frequency from an antenna disposed adjacent to the transmission resonator; and identifying whether a human body approaches, at least based on a signal sensed from the signal corresponding to the second frequency, by the controller.

According to various example embodiments, the method may further include identifying whether the human body approaches, based on a variation in impedance of the signal sensed from the signal corresponding to the second frequency.

According to various example embodiments, the method may further include identifying whether the human body approaches, based on a phase of the signal sensed from the signal corresponding to the second frequency.

According to various example embodiments, the method may further include identifying whether the human body approaches, based on a change in at least one of a Q-factor, reflection coefficient, reflection loss, coupling coefficient, or standing wave ratio of the signal sensed from the signal corresponding to the second frequency.

According to various example embodiments, a wireless power transmitting device may comprise: a power amplifier; a transmission resonator including a coil, configured to receive an electrical signal corresponding to a first frequency, output through the power amplifier, and to form a magnetic field by the received electrical signal corresponding to the first frequency to transmit power; an antenna disposed adjacent to the transmission resonator and configured to receive a signal corresponding to a second frequency; a sensing circuit configured to sense at least part of the signal corresponding to the second frequency transmitted to the antenna; and a controller configured to determine whether a human body approaches, at least based on a signal sensed through the sensing circuit. A first output terminal of the sensing circuit may be connected to a first portion of the antenna, and a second output terminal of the sensing circuit may be connected to the coil of the transmission resonator.

According to various example embodiments, the controller may be configured to identify whether the human body approaches, based on a variation in impedance of the signal sensed through the sensing circuit.

According to various example embodiments, the controller may be configured to identify whether the human body approaches, based on a phase of the signal sensed through the sensing circuit.

According to various example embodiments, the controller may be configured to identify whether the human body approaches, based on a change in at least one of a Q-factor, reflection coefficient, reflection loss, coupling coefficient, or standing wave ratio of the signal sensed through the sensing circuit.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1ˢᵗ" and "2ⁿᵈ," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wireless power transmitting device comprising:
a power amplifier;
a transmission resonator including a coil, and configured to receive an electrical signal corresponding to a first frequency, output through the power amplifier, and to form a magnetic field by the received electrical signal corresponding to the first frequency;
an antenna configured in a shape corresponding to a half portion of a split ring resonator (SRR) antenna, disposed adjacent to the transmission resonator, and configured to receive a signal corresponding to a second frequency, wherein the half portion of the SRR antenna corresponds to a section of the SRR antenna divided along a symmetrical axis of the SRR antenna;
a sensing circuit configured to sense at least part of the signal corresponding to the second frequency transmitted to the antenna; and
a controller configured to identify whether a human body approaches, based on a signal sensed through the sensing circuit,
wherein a first terminal of a port is connected to a portion of the antenna, and a second terminal of the port is connected to the transmission resonator and configured to function as a ground.

2. The wireless power transmitting device of claim 1, wherein the controller is configured to identify whether the human body approaches, based on a variation in impedance of the signal sensed through the sensing circuit.

3. The wireless power transmitting device of claim 1, wherein the controller is configured to identify whether the human body approaches, based on a phase of the signal sensed through the sensing circuit.

4. The wireless power transmitting device of claim 1, wherein the controller is configured to identify whether the human body approaches, based on a change in at least one of a Q-factor, reflection coefficient, reflection loss, coupling coefficient, or standing wave ratio of the signal sensed through the sensing circuit.

5. The wireless power transmitting device of claim 1, wherein the controller is configured to identify whether a conductor approaches based on the electrical signal corresponding to the first frequency transmitted through the transmission resonator.

6. The wireless power transmitting device of claim 1, wherein the antenna is disposed adjacent to an inner side of the transmission resonator.

7. The wireless power transmitting device of claim 6, wherein the antenna is disposed adjacent to the inner side of the transmission resonator to correspond to a shape of the coil of the transmission resonator.

8. The wireless power transmitting device of claim 6, wherein the antenna includes a first antenna and a second antenna, and
wherein the second antenna is disposed opposite to the first antenna.

9. The wireless power transmitting device of claim 1, wherein the antenna is disposed adjacent to an outer side of the transmission resonator.

10. The wireless power transmitting device of claim 1, wherein the first frequency is greater than the second frequency.

11. The wireless power transmitting device of claim 1, wherein the antenna includes a stub in a second portion of the antenna to form an inverted F antenna (IFA) shape.

12. The wireless power transmitting device of claim 11, wherein the stub is connected to the transmission resonator to perform impedance matching.

13. A method for detecting an approaching object by a wireless power transmitting device, the method comprising, transmitting power by forming a magnetic field by an electrical signal corresponding to a first frequency, output through a power amplifier, by a transmission resonator including a coil;
identifying whether a conductor approaches, based on a signal sensed from the electrical signal corresponding to the first frequency, by a controller;
transmitting a signal corresponding to a second frequency from an antenna configured in a shape corresponding to a half portion of a split ring resonator (SRR) antenna and disposed adjacent to the transmission resonator, wherein the half portion of the SRR antenna corresponds to a section of the SRR antenna divided along a symmetrical axis of the SRR antenna; and
identifying whether a human body approaches, based on a signal sensed from the signal corresponding to the second frequency, by the controller.

14. The method of claim 13, further comprising identifying whether the human body approaches, based on a variation in impedance of the signal sensed from the signal corresponding to the second frequency.

15. The method of claim 13, further comprising identifying whether the human body approaches, based on a phase of the signal sensed from the signal corresponding to the second frequency.

16. The method of claim 13, further comprising identifying whether the human body approaches, based on a change in at least one of a Q-factor, reflection coefficient, reflection loss, coupling coefficient, or standing wave ratio of the signal sensed from the signal corresponding to the second frequency.

17. A wireless power transmitting device comprising, a power amplifier;

a transmission resonator including a coil, and configured to receive an electrical signal corresponding to a first frequency, output through the power amplifier, and to form a magnetic field by the received electrical signal corresponding to the first frequency to transmit power;

an antenna implemented using a split ring resonator (SRR) antenna, wherein the antenna is configured in a semi-spherical shape corresponding to one side of a symmetrical axis of the SRR antenna and is disposed adjacent to the transmission resonator and configured to receive a signal corresponding to a second frequency;

a sensing circuit is configured to sense at least part of the signal corresponding to the second frequency transmitted to the antenna; and a controller is configured to determine whether a human body approaches, based on a signal sensed through the sensing circuit, wherein a first terminal of a port is connected to a portion of the antenna, and a second terminal of the port is connected to the transmission resonator and configured to function as a ground.

18. The wireless power transmitting device of claim 17, wherein the controller is configured to identify whether the human body approaches, based on a variation in impedance of the signal sensed through the sensing circuit.

19. The wireless power transmitting device of claim 17, wherein the controller is configured to identify whether the human body approaches, based on a phase of the signal sensed through the sensing circuit.

20. The wireless power transmitting device of claim 17, wherein the controller is configured to identify whether the human body approaches, based on a change in at least one of a Q-factor, reflection coefficient, reflection loss, coupling coefficient, or standing wave ratio of the signal sensed through the sensing circuit.

\* \* \* \* \*